United States Patent
Iguchi et al.

(10) Patent No.: US 9,162,450 B2
(45) Date of Patent: Oct. 20, 2015

(54) IMAGE PROCESSING APPARATUS AND IMAGE PROCESSING METHOD

(71) Applicant: CANON KABUSHIKI KAISHA, Tokyo (JP)

(72) Inventors: Ryosuke Iguchi, Kawasaki (JP); Akitoshi Yamada, Yokohama (JP); Mitsuhiro Ono, Tokyo (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/847,357

(22) Filed: Mar. 19, 2013

(65) Prior Publication Data
US 2013/0249989 A1 Sep. 26, 2013

(30) Foreign Application Priority Data
Mar. 22, 2012 (JP) ................................. 2012-065662

(51) Int. Cl.
*B41J 2/07* (2006.01)
*H04N 1/40* (2006.01)

(52) U.S. Cl.
CPC ............... *B41J 2/07* (2013.01); *H04N 1/40087* (2013.01)

(58) Field of Classification Search
None
See application file for complete search history.

(56) References Cited

U.S. PATENT DOCUMENTS

| | | | |
|---|---|---|---|
| 6,149,264 A * | 11/2000 | Hirabayashi et al. | 347/43 |
| 2006/0066671 A1* | 3/2006 | Kato et al. | 347/43 |
| 2007/0070444 A1* | 3/2007 | Sakakibara et al. | 358/474 |
| 2009/0002739 A1* | 1/2009 | Lapstun et al. | 358/1.9 |

* cited by examiner

*Primary Examiner* — Geoffrey Mruk
*Assistant Examiner* — Scott A Richmond
(74) *Attorney, Agent, or Firm* — Canon USA, Inc., IP Division

(57) ABSTRACT

An image processing apparatus includes an acquiring unit which acquires first image data indicating a first gray-scale value of an image having a first attribute and a second image data indicating a second gray-scale value of an image having a second attribute that is different from the first attribute, a correcting unit which corrects the first gray-scale value and the second gray-scale value acquired by the acquiring unit on basis of information on an ejection characteristic of a discharge head to different extents, the discharge head ejecting liquid to be used for forming the first image and the second image on a recording medium with dots.

26 Claims, 15 Drawing Sheets

IMAGE PROCESSING APPARATUS AND IMAGE PROCESSING METHOD

BACKGROUND OF THE INVENTION

1. Field of the Invention

The present invention relates to image processing apparatuses and methods.

2. Description of the Related Art

A method has been known in which image processing is performed separately on a character part and a picture part in edited image data or optically scanned image data.

U.S. Patent Application Publication No. 2009/002739 discloses encoding continuous gray scale data and bi-level data by means of a computer, transferring them to an ink-jet printer, decoding them in the printer, then half-toning the continuous gray scale data to acquire bi-level color data in the printer, synthesizing the bi-level data and the bi-level color data to acquire print data and printing the data.

Edited image data or optically scanned image data may include a picture, picture image data and character image data. Ink color conversion is not performed on continuous gray scale data of character image data. However, the method disclosed in the Description of U.S. Patent Application Publication No. 2009/002739 does not provide a proper amount of ink for some types of printing media, resulting in undesirable image quality of printed matters. Furthermore, applying a same correction process on image data and character data is not always appropriate to correct image data in consideration of manufacturing variations of print heads.

SUMMARY OF THE INVENTION

The present invention provides an image forming apparatus which allows generation of bi-level recording data including character data, a picture, and/or picture image data for all of which appropriate amounts of ink are set.

An image processing apparatus according to the present invention includes an acquiring unit which acquires first image data indicating a first gray-scale value of an image having a first attribute and a second image data indicating a second gray-scale value of an image having a second attribute that is different from the first attribute, a correcting unit which corrects the first gray-scale value and the second gray-scale value acquired by the acquiring unit on basis of information on an ejection characteristic of a discharge head to different extents, the discharge head ejecting liquid to be used for forming the first image and the second image on a recording medium with dots, and a generating unit which generates first dot data indicating the presence of formed dots for forming the first image on the basis of the first gray-scale value corrected by the correcting unit and second dot data indicating the presence of formed dots for forming the second image on the basis of the second gray-scale value corrected by the correcting unit.

Further features of the present invention will become apparent from the following description of exemplary embodiments with reference to the attached drawings.

DESCRIPTION OF THE EMBODIMENTS

Embodiments of the present invention will be described in detail below with reference to drawings.

Figure 1:
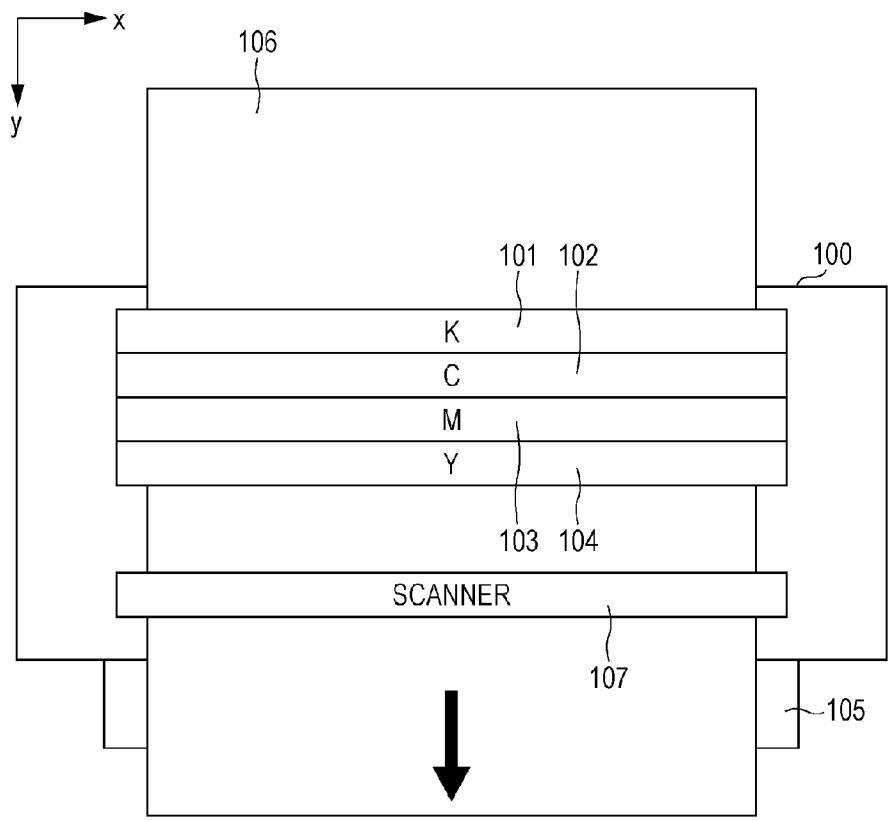
FIG. 1 schematically illustrates an ink-jet printer according to an embodiment of the present invention.

FIG. 1 schematically illustrates a printer that is an ink-jet recording device as a device configured to eject liquid for recording according to an embodiment of the present invention. A printer of this embodiment is a full-line type recording device and includes recording heads 101 to 104, as illustrated in FIG. 1. Each of the recording heads 101 to 104 has a plurality of nozzles (discharge ports) which eject a same type of ink corresponding to a width of a recording medium 106, and a nozzle array (discharge port array) having the nozzles is disposed in an x-direction (predetermined direction) at pitches of 1200 dpi. The recording heads 101 to 104 function as discharge heads which eject black (K), cyan (C), magenta (M) and yellow (Y) inks. The recording heads 101 to 104 which eject a plurality of kinds of ink are disposed in parallel along a y-direction as illustrated in FIG. 1 to implement the recording heads of this embodiment.

Figure 2:
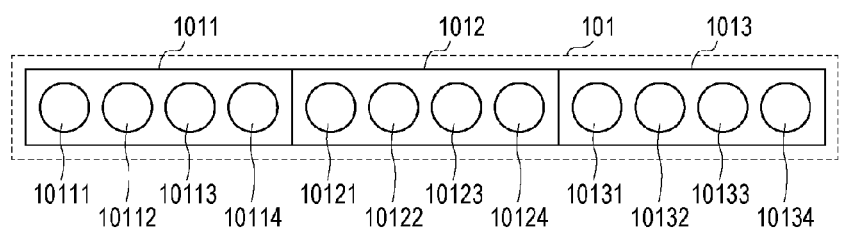
FIG. 2 illustrates a configuration of a recording head according to an embodiment that is applicable to the present invention.

FIG. 2 illustrates a nozzle array of the recording head 101. As illustrated in FIG. 2, the recording head 101 has a plurality of discharge substrates 1011 to 1013 along the direction of the nozzle array. Each of the discharge substrates has four nozzle arrays extending in the direction of the nozzle array. The recording heads 101 to 104 eject a plurality of color inks to corresponding areas on a recording medium to record an image.

Referring back to FIG. 1, a conveyance roller 105 (and other rollers, not illustrated) is rotated by a driving force of a motor (not illustrated) so that the recording medium 106 is conveyed in the y-direction in FIG. 1. While the recording medium 106 is being conveyed, a plurality of nozzles of the recording heads 101 to 104 perform an ejection operation according to record data at a frequency corresponding to the speed of conveyance of the recording medium 106. Thus, dots of the colors are recorded with a resolution predetermined on the basis of record data to form an image for one page of the recording medium 106.

A scanner 107 is disposed at a downstream position from the recording heads 101 to 104 in the y-direction. The scanner 107 has reading elements at predetermined pitches in parallel with the recording heads 101 to 104. The scanner 107 may read an image recorded with the recording heads 101 to 104 and output it as RGB multi-level data.

It should be noted that a recording device to which the present invention is applicable is not limited to a full-line type device as described above. For example, the present invention is applicable to a what-is-called serial type recording device which scans a recording head and/or a scanner in the direction crossing the direction of conveyance of a recording medium. While this embodiment has a recording head for each ink color, one recording head may eject a plurality of color inks. Furthermore, a nozzle array corresponding to a plurality of color inks may be disposed on one discharge substrate.

Figure 3:
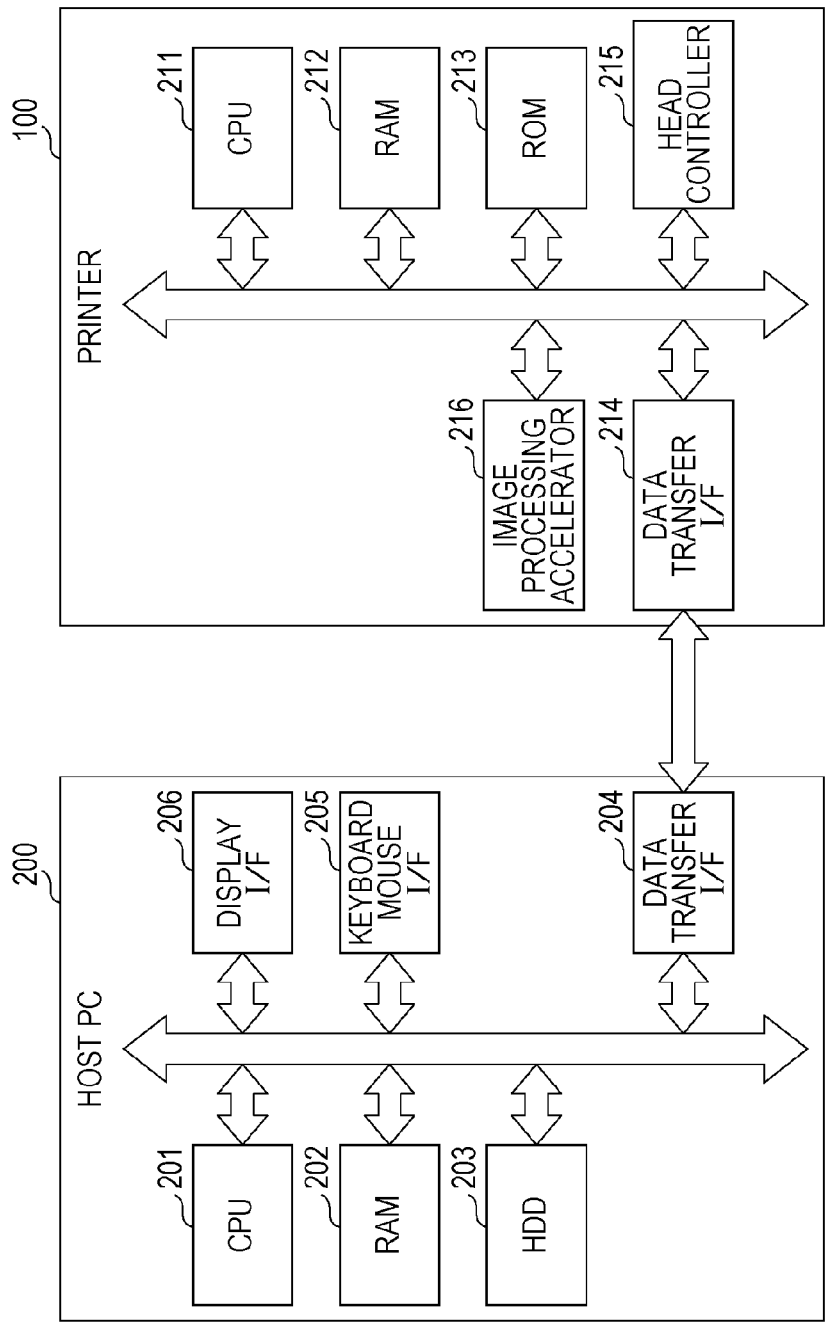
FIG. 3 is a block diagram illustrating a recording system according to an embodiment of the present invention.

FIG. 3 is a block diagram illustrating a recording system according to an embodiment of the present invention. As illustrated in FIG. 3, the recording system has the printer 100 illustrated in FIG. 1 and a personal computer (PC) 200 as a host apparatus therefor.

The host PC 200 principally has the following elements. A CPU 201 performs a process according to a program held in an HDD 203 and/or a RAM 202 which are storage units. The RAM 202 is a volatile storage and temporarily stores or holds a program and/or data. The HDD 203 is a non-volatile storage and also stores or holds a program and/or data. A quantization mask, which will be described below, is also stored in the HDD 203. According to this embodiment, a data transfer interface (I/F) 204 controls over transmission and reception of data to and from the printer 100. USB, IEEE1394, LAN or the like may be used as a data transmission and reception connection method. A keyboard/mouse I/F 205 control a Human Interface Device (HID) such as a keyboard and a mouse, and this I/F allows a user to input. A display I/F 206 controls representation on a display (not illustrated).

On the other hand, the printer 100 principally includes the following elements. A CPU 211 performs a process of an embodiment, which will be described below, according to a program held in a ROM 213 and/or a RAM 212. The RAM 212 is a volatile storage and temporarily stores or holds a program and/or data. The ROM 213 is a non-volatile storage and may also hold table data and/or a program to be used in a process, which will be described below.

A data transfer interface (I/F) 214 controls over transmission and reception of data to and from the host PC 200. A head controller 215 supplies record data to the recording heads 101 to 104 illustrated in FIG. 1 and control ejection operations of the recording heads. More specifically, the head controller 215 may be configured to read a control parameter and record data from a predetermined address in the RAM 212. When the CPU 211 writes a control parameter and record data at the predetermined address in the RAM 212, the head controller 215 starts processing whereby the recording heads eject ink. The scanner controller 217 controls individual reading elements in the scanner 107 illustrated in FIG. 1 and outputs the resulting RGB data to the CPU 211.

An image processing accelerator 216 is hardware which may perform image processing fast under the control of the CPU 211. More specifically, the image processing accelerator 216 is configured to read a parameter necessary for image processing from a predetermined address in the RAM 212. When the CPU 211 writes the parameter and data to the predetermined address in the RAM 212, the image processing accelerator 216 is started to perform a predetermined image process on the data. According to this embodiment, a quantization mask determining process, which will be described below, is implemented by a software process under the control of the CPU 211. On the other hand, image processing in recording including processing by a quantization processing unit is implemented by hardware by means of the image processing accelerator 216. It should be noted that the image processing accelerator 216 is not always necessary, but the processing of generating a table parameter and image processing as described above may be implemented by the CPU 211 only in accordance with the specifications of printers.

An embodiment in the recording system for correcting an uneven color density due to variations of ejection characteristics of a plurality of nozzles through an HS process will be described below.

Figure 4:
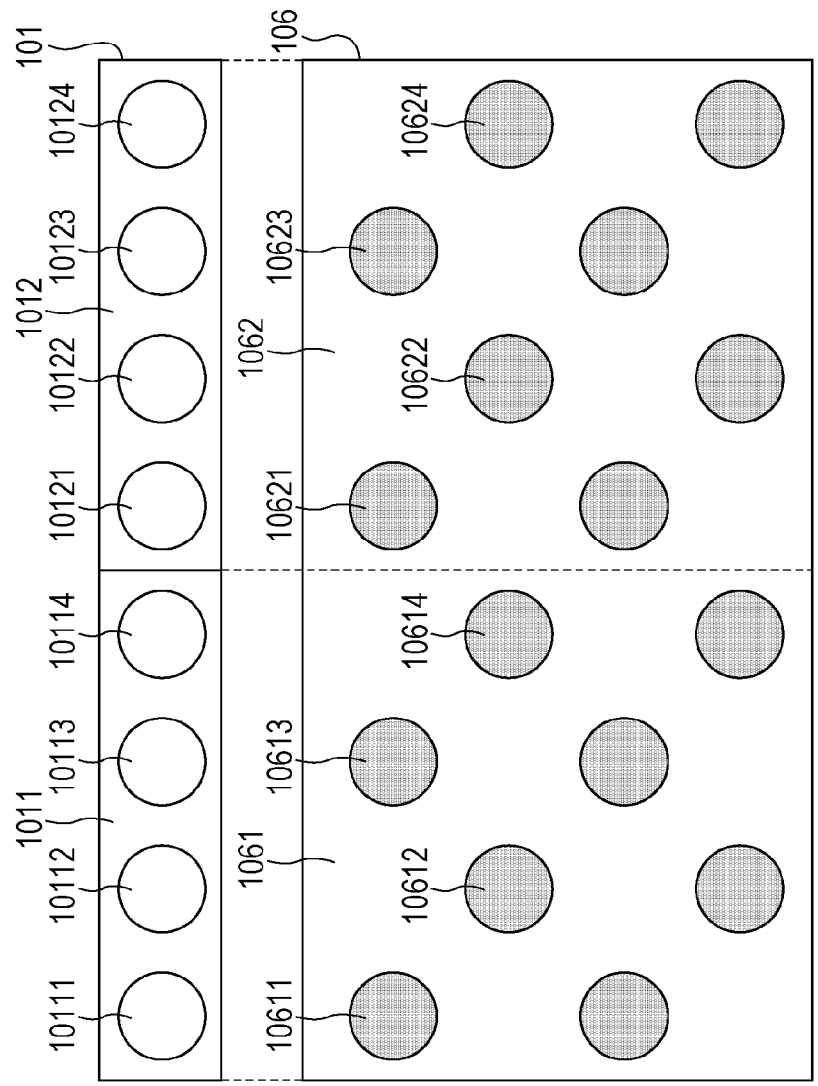
FIGS. 4A and 4B illustrate dot arrangement patterns on recording heads with an equal discharge rate.

FIGS. 4A and 4B illustrate dot arrangement patterns represented by a recording head having nozzles with an equal discharge rate and ink ejected therefrom on a discharge substrate. FIG. 4A illustrates the recording heads 101 which eject K-ink that is a first ink. FIG. 4A only illustrates eight nozzles of a nozzle array in the recording heads for simple description and illustration. FIG. 4B illustrates a recorded state of a solid image with 50% duty cycle recorded on the recording medium 106 by using the nozzles in FIG. 4A. In other words, FIG. 4B illustrates a model in which ink dots are ejected at a ratio of two to one, compared with 100% duty cycle. On the recording medium 106, an area to be recorded with left four nozzles in FIGS. 4A and 4B will be called a first area, and an area recorded with right four nozzles will be called a second area. It should be noted that FIGS. 4A and 4B illustrates nozzles and dots recorded with the nozzles having an equal size for easy understanding of their correspondence relationship though their sizes are not equal in reality. Because the discharge rates of the nozzles may vary due to other factors than the nozzle diameters, the nozzle diameters may not necessarily be different. However, FIGS. 4A and 4B illustrate large circles to represent nozzles having a high discharge rate.

Figure 5:
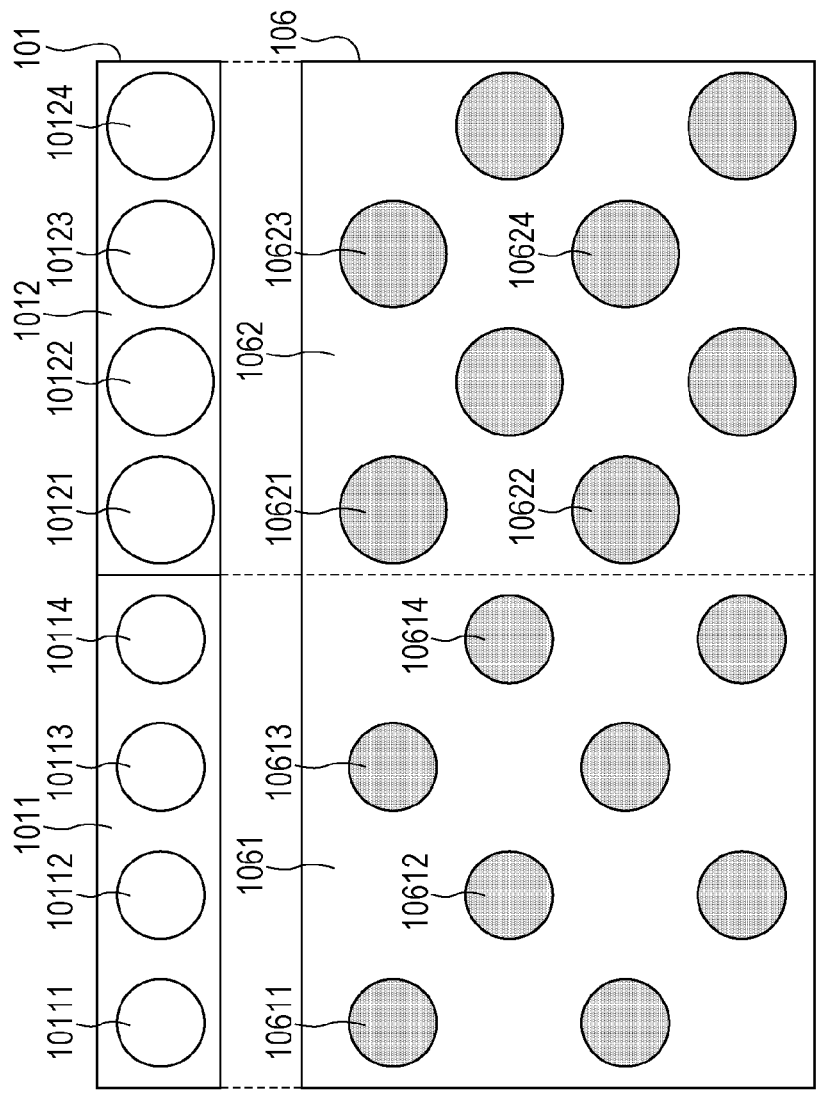
FIGS. 5A and 5B illustrate dot arrangement patterns of recording heads with different discharge rates.

The eight nozzles 10111 to 10114 and 10121 to 10124 of the recording head 101 are all capable of ejecting a normal amount of ink in a normal direction, and dots having an equal size are recorded at constant intervals on the recording medium 106. On the other hand, FIGS. 5A and 5B illustrate dot arrangement patterns represented by recording heads having nozzles with different discharge rates on discharge substrates and ink ejected therefrom. FIG. 5A illustrates nozzles of recording heads, and FIG. 5B illustrates a recorded state of a solid image with 50% duty cycle recorded on the recording medium 106 by using the nozzles illustrated in FIG. 5A.

Here, among eight nozzles of the recording head 101, the left four nozzles 10111 to 10114 have a normal discharge rate, and the right four nozzles 10121 to 10124 have a higher discharge rate than the normal discharge rate. When recording heads having varied discharge rates like the recording heads 101 are used, an image recorded in one color on a recording medium may have different color densities between areas. In FIGS. 5A and 5B, a solid image is recorded at a normal color density in an area (first area) subject to recording with the left four nozzles in FIG. 5A. On the other hand, a solid image is recorded at a higher color density, compared with the first area, in an area (second area) subject to recording with the right four nozzles in FIG. 5A because the sizes of the dots are larger. In other words, the first area and the second area have different color densities as a result.

Figure 6:
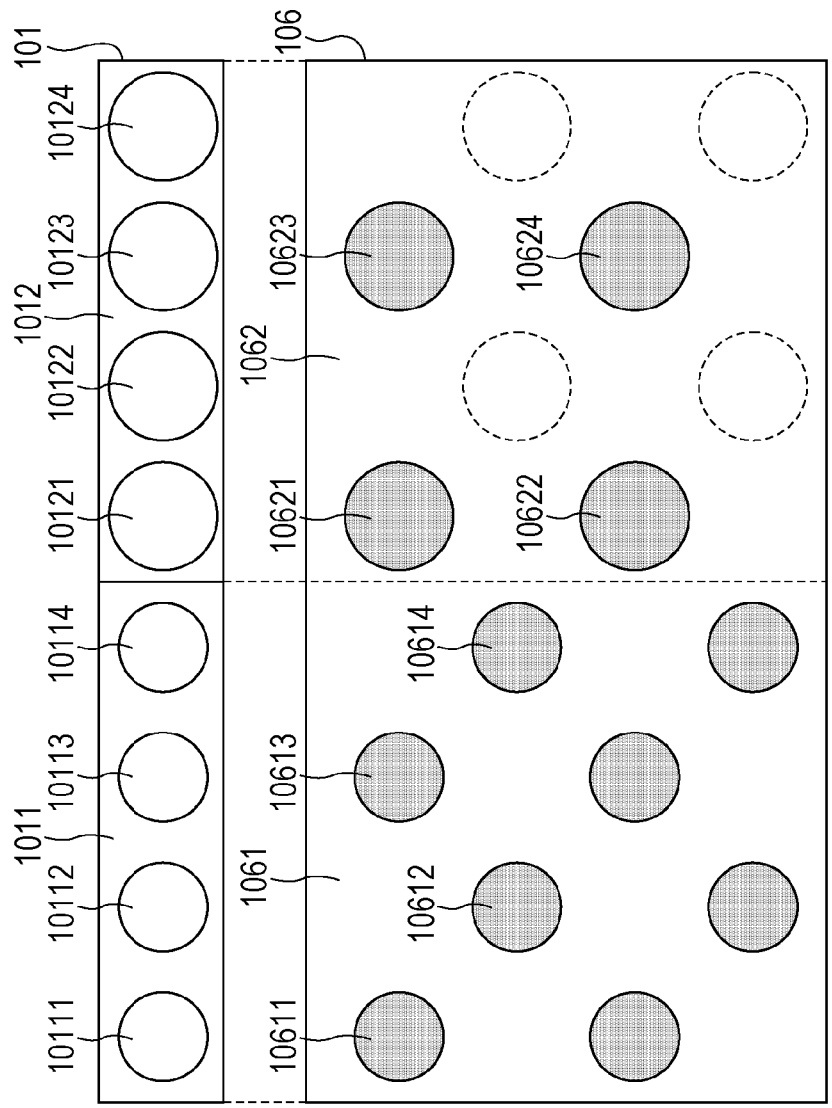
FIGS. 6A and 6B illustrate dot arrangement patterns on recording heads in FIGS. 5A and 5B subject to an HS process.

When recording heads having such ejection characteristics, image data correction through an HS process may be performed. The correction will be described with reference to FIGS. 6A and 6B. Image data corresponding to the right four nozzles 10121 to 10124 of the nozzles of the recording head 101 are corrected so as to reduce their color density. More specifically, dot data (bi-level data) defining the presence of a dot as dot recorded (1) or not-recorded (0) such that the number of dots to be recorded by the right four nozzles 10121 to 10124 may be lower than the number of dots to be recorded by the left four nozzles 10111 to 10114. FIG. 6B illustrates an image to be recorded on the recording medium 106 after an HS process is performed on image data of a solid image recorded with 50% duty cycle with ink from the right four nozzles. FIG. 6B illustrates a dot 10611 recorded with the nozzle 10111 and a dot 10621 recorded with the nozzle 10121. It is assumed exemplarily that the area on a recording medium having dots of ink ejected from the right four nozzles 10121 to 10124 is twice as the area on the recording medium having dots of ink ejected from the left four nozzles 10121 to 101242. In this case, the HS process makes the number of times of ejection from the right four nozzles 10121 to 10124 approximately half (2 dots→1 dot) of the number of times of ejection from the left four nozzles 10111 to 10114 so that the covered areas on the recording medium may substantially equal. In this way, an HS process adjusts the number of dots to be recorded on areas such that the color densities detected on the areas on a recording medium may be substantially equal. It should be noted that though color densities detected as covered areas are not necessarily proportional in reality, a double area has a half number of dots in this embodiment.

As described above, the HS process adjusts the number of dots to be recorded such that the total area of a region 1061 may be equal to the total area of a region 1062. If the color density observed with an optical absorption characteristic of the region 1061 is equal to the color density observed with an optical absorption characteristic of the region 1062, the color densities of both areas appear to have substantially an identical color.

Such variations of ejection characteristics may occur in a multi-level recording device allowing changes of the sizes of dots such as a 4-level recording device which records with three stages of large, medium and small dots. Then, the present invention is also applicable to a 3-level or higher multi-level recording device, without limiting to a bi-level recording device. Also in order to perform the HS process, an ejection characteristic such as a discharge rate of each of nozzles may be required to detect. Ink may be ejected in advance from nozzles to a recording medium to form a pattern, and the color densities of the pattern may be detected. Alternatively, data on the ejection characteristics measured in advance may be prestored in a memory provided within a recording device or a recording head, for example, so that an image processing apparatus may acquire the data to detect the ejection characteristics.

First Embodiment

Figure 7:
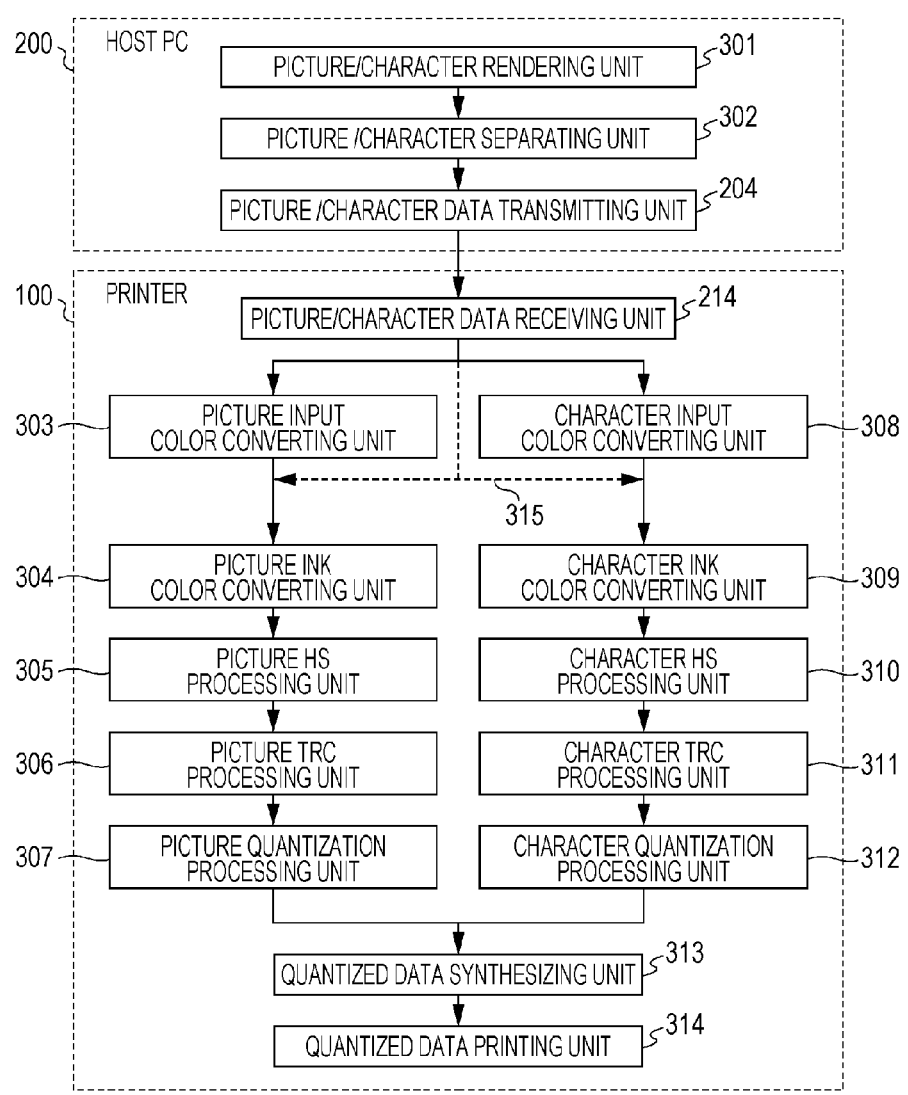
FIG. 7 illustrates a configuration of image processing to be executed by an ink-jet printer according to an embodiment of the present invention.

FIG. 7 is a block diagram illustrating a configuration of image processing to be executed by an image processing apparatus corresponding to an ink-jet printer according to a first embodiment of the present invention. In other words, according to this embodiment, an image processing unit includes elements for control and processing by the printer 100 illustrated in FIG. 3. It should be noted that the application of the present invention is not limited to the configuration. For example, a host PC 200 illustrated in FIG. 3 may include the image processing unit or a part of an image processing unit, and the other part may be provided in the printer 100. Exemplarily, a picture is given as an image having a first attribute, and a character is given as an image having a second attribute that is different from the first attribute, in the following description.

As illustrated in FIG. 7, a picture/character rendering unit 301 renders image data stored or held in the host PC 200. Next, a picture/character separating unit 302 separates the rendered image data into picture image data (first image data) and character image data (second image data). According to this embodiment, image data separated into picture image data and character image data in advance is input. For example, two layers of full-color image data and monochrome image data may be held in a TIFF file format, and the full-color image data may be held as picture image data, and the monochrome image data may be held as character image data. Alternatively, in a PDF file format, picture image data may be held as bitmap data, and the character image data may be held as vector data. Further alternatively, rendering intent of an image may be referred, and perceptual rendering intent may be held as picture image data, and colorimetric rendering intent may be held as character image data. Moreover, a file format describing picture/character identification information of image data may be generated, and picture data or character data may be identified on the basis of the identification information. Any method may be used as far as it allows identification of picture image data and character image data. According to this embodiment, picture image data are image data configured by 8-bit RGB signal values. On the other hand, character image data may also be configured by 8-bit RGB signal values like picture image data or may be 1-bit bi-level image data. It will be handled as maltivalued image data of 8-bit RGB signal values in the following descriptions. The separated image data are transferred from the picture/character-data transmitting unit 204 to a picture/character receiving unit 214 in the printer 100. It is assumed that the picture image data and character image data have an equal resolution.

The picture/character receiving unit 214 separates the image data received by the printer 100 into picture image data and character image data. The picture image data becomes picture quantized data that are first dot data through a picture input color converting unit 303, a picture ink color converting unit 304, a picture HS processing unit 305, a picture TRC processing unit 306, and a picture quantization processing unit 307, which are included in a first generating unit. On the other hand, the character image data becomes character quantized data that are second dot data through a character input color converting unit 308, a character ink color converting unit 309, a character HS processing unit 310, a character TRC processing unit 311, and a character quantization processing unit 312, which are included in a second generating unit.

Among the processing units 303 to 307 which process picture image data, the picture input color converting unit 303 first converts picture input image data received from the picture/character receiving unit 214 to image data supporting the color gamut of the printer. According to this embodiment, image data to be input are data describing color coordinates (R, G, B) of sRGB color space coordinates, for example, which are representation colors of a monitor. The picture input color converting unit 303 converts 8-bit R, G, B input image data to image data (R', G', B') in the color gamut of the printer by a known method such as matrix operation processing or processing using a three-dimensional LUT. According to this embodiment, a three-dimensional look-up table (3D LUT) is used to perform the conversion processing also by performing an interpolation operation.

The picture ink color converting unit 304 as a first converting unit of this embodiment converts R', G', and B' 8-bit image data processed by the picture input color converting unit 303 to image data based on color signal data of ink used in a printer. Because the printer 100 of this embodiment uses black (K), cyan (C), magenta (M), yellow (Y) inks, image data containing RGB signals are converted to image data containing K, C, M, and Y 8-bit color signals which are first ink color data. This color conversion is performed by using a three-dimensional look-up table and performing an interpolation operation, like the input color conversion processing unit as described above. Matrix operation processing may alternatively be used for the conversion. Having given four inks of K, C, M, Y as an example, other inks may be added such as light cyan (Lc) and light magenta (Lm), and gray (Gy) having a lower color density.

The picture Head Shading (HS) processing unit 305 receives image data of ink color signals and converts 8-bit data for each ink color to image data of ink color signals depending on discharge rates that are volumes of droplets ejected by nozzles included in a recording head. In other words, the HS processing unit 305 performs the same processing as the HS process by using a one-dimensional look-up table. The HS process will be described in detail below.

The picture Tone Reproduction Curve (TRC) processing unit 306 corrects picture image data including 8-bit ink color signals subject to the picture HS process to adjust the number of dots to be recorded in a quantized data printing unit 314 for each ink color. Generally, no linear relationship is present between the number of dots recorded on a recording medium and an optical color density implemented by the number of dots on the recording medium. In order to make the relationship linear, the picture TRC processing unit 306 corrects 8-bit image data to adjust the number of dots to be recorded on a recording medium.

The picture quantization processing unit 307 performs a quantization process on 8-bit, 256-level ink color picture image data processed by the picture TRC processing unit 306 and thus generates 1-bit, bi-level data indicative of recorded (1) or not-recorded (0). However, the configuration of the picture quantization processing unit 307 is not particularly limited when the present invention is applied. For example, the picture quantization processing unit 307 may convert 8-bit image data directly to bi-level data (dot data) or may quantize data having several-bit, multi-level gray-scale values and then finally convert it to bi-level data. The quantization processing method may be dithering. When quantized data, which will be described below, are synthesized by an error diffusion method, for example, an error is propagated in two image data differently. As a result, ink dots may be printed one over another on paper. Dithering controls ejection of ink dots for each pixel. Thus, when two quantized data pieces are synthesized, it does not effect on other pixels and therefore is useful in this embodiment.

On the other hand, among the processing units 308 to 312 which process character image data, the character input color converting unit 308 converts character input image data to image data supporting the color gamut of the printer, like the method of processing picture image data. The character ink color converting unit 309 converts R, G, B 8-bit image data to image data based on color signal data of ink used in a printer. The character HS processing unit 310 converts 8-bit data for each ink color to image data of ink color signals depending on discharge rates of nozzles. The character TRC processing unit 311 performs a correction to adjust the number of dots to be recorded in the quantized data printing unit 314 for each ink color. The character quantization processing unit 312 performs quantization process on ink color character image data and generates 1-bit, bi-level data indicative of recorded (1) or not-recorded (0).

Then, the quantized data synthesizing unit 313 as a third generating unit synthesizes data resulting from quantization of picture image data and data resulting from quantization of character image data to generate dot data. The bi-level data (dot data) acquired by a quantization records which ink is to be ejected for each pixel position. Normally, the occupied area of a picture part and the occupied area of a character part in an image are exclusive. Therefore, ink for a character part is not ejected at pixel positions where ink for picture part is to be ejected. Conversely, ink for a picture part is not ejected at pixel positions where ink for a character part is ejected. Thus, the quantized data synthesizing unit 313 may simply add two quantized data pieces to generate synthesized data. When pixels in a picture part and pixels in character part are not exclusive, quantized data may be synthesized by prioritizing one of the image data pieces.

The quantized data printing unit 314 drives a recording head on the basis of the bi-level data (dot data) acquired by the quantization to eject and record color inks on a recording medium. According to this embodiment, the quantized data printing unit 314 includes a recording mechanism having the recording heads 101 to 104 illustrated in FIG. 1.

The picture ink color converting unit 304 and the character ink color converting unit 309 according to this embodiment will be described below in detail. The picture ink color converting unit 304 converts input image data containing 8-bit RGB signal values to image data containing K, C, M, Y 8-bit color signals. In the conversion, in order to reproduce the picture with high image quality, black such as (R', G', B')=(16, 16, 16) is not limited to K ink only, but C, M, and Y inks may be combined to reproduce black on the recording medium 106, for example. According to an example, in order to reproduce black of (R', G', B')=(16, 16, 16) with K ink only, (K, C, M, Y)=(240, 0, 0, 0) is adopted. However, C, M, and Y inks are combined, color which may not be reproduced with K ink only may be reproduced by reducing K ink and adding C, M, and Y inks as in (K, C, M, Y)=(235, 128, 128, 96). This allows smooth reproduction of gradation from black to surrounding colors. In other words, the gradation property may be improved. Furthermore, for black of (R', G', B')=(0, 0, 0), (K, C, M, Y)=(255, 128, 128, 0), for example, may be adopted to reproduce black rather than (K, C, M, Y)=(255, 0, 0, 0). In this way, black with a high color density which may not be reproduced with K ink only may be printed by adding a different ink.

On the other hand, the character ink color converting unit 309 converts input image data containing an 8-bit monochrome signal value (or 1 channel) to image data containing an 8-bit color signal for K only. As in the example, black of (R', G', B')=(16, 16, 16) is represented by (Gy)=(16). Because a character part requires higher legibility of characters than higher reproducibility of gradation as in a picture part, black of ((Gy)=(16) as in the example may be reproduced only with K ink as (K, C, M, Y)=(240, 0, 0, 0). In this way, changing ink colors to be ejected to a recording medium 106 between a picture part and a character part for same black may achieve printing with improved gradation in the picture part and improved legibility in the character part. In order to do so, according to this embodiment, the host PC 200 separates input image data into a picture part and a character part.

According to this embodiment, the legibility of a thin line is another reason for separating input image data into a picture part and a character part for processing. In the printing system illustrated in FIG. 1, not all of the K, C, M, and Y recording heads may eject ink to correct positions. For example, when input image data contains a thin line rendered in black with (R', G', B')=(16, 16, 16) and when all of K, C, M, and Y inks are combined to reproduce the black thin line on the recording medium 106, at least one of the four ink colors may be displaced. As a result, the thin line may be blurred, which may reduce the legibility. On the other hand, when a black thin line is reproduced only with K ink, the thin line may not be blurred because of absence of other inks since displacement of another recording head may not occur, which may increase the legibility. For this reason, it may be required to separate input image data into a picture part and a character part for ink color conversion processing.

Furthermore, according to this embodiment, another reason why input image data is separated into a picture part and a character part for processing is to differentiate the amount of ejection of K ink between a picture part and a character part in input image data in same black. In other words, for black with (R', G', B')=(16, 16, 16), K ink with (K, C, M, Y)=(240, 0, 0, 0) is ejected to a picture part. On the other hand, K ink is ejected to acquire (K, C, M, Y)=(250, 0, 0, 0) in a character part for higher contrast of characters. This allows characters in input image data in same black to be printed thicker, which thus may increase the legibility of the characters. When a medium on which ink runs like ordinary paper is used, K ink with (K, C, M, Y)=(240, 0, 0, 0) is ejected to a character part for black with (R', G', B')=(16, 16, 16), a small character and/or a complicated character in K ink may be blurred, which may reduce their legibility. Ink color conversion may be performed so as to reduce the discharge rate of K ink to print on such a medium. In the example above, (K, C, M, Y)=(220, 0, 0, 0) is adopted to reduce the ink discharge rate and thus reproduce characters with less blur. Also for this reason, it may be required to separate input image data into a picture part and a character part for ink color conversion processing.

Next, a method for determining a discharge rate in an HS process will be described. Determining a discharge rate corresponds to determining the size of ink dots to be ejected from nozzles. On the basis of the determination result, one dimensional look-up table in an HS process is determined. Finally, the number of dots of inks on a recording medium is determined. It may also be used as a parameter for determination for switching in a quantization process, which will be described below.

An HS process is a conversion process to be performed using a conversion table to image data corresponding to nozzles for recording on unit areas in recording area on a recording medium. This may reduce differences in color density between unit areas due to variations in discharge rates of the nozzles. In order to perform the HS process, a conversion table may be generated for each data corresponding to a group of a predetermined number of nozzles for unit areas. For generation of a conversion table, it is determined which nozzles are used for which unit area in advance. In other words, before the HS process is performed, correspondence between unit areas on a recording area on a recording medium and nozzles may be defined.

Figure 8:
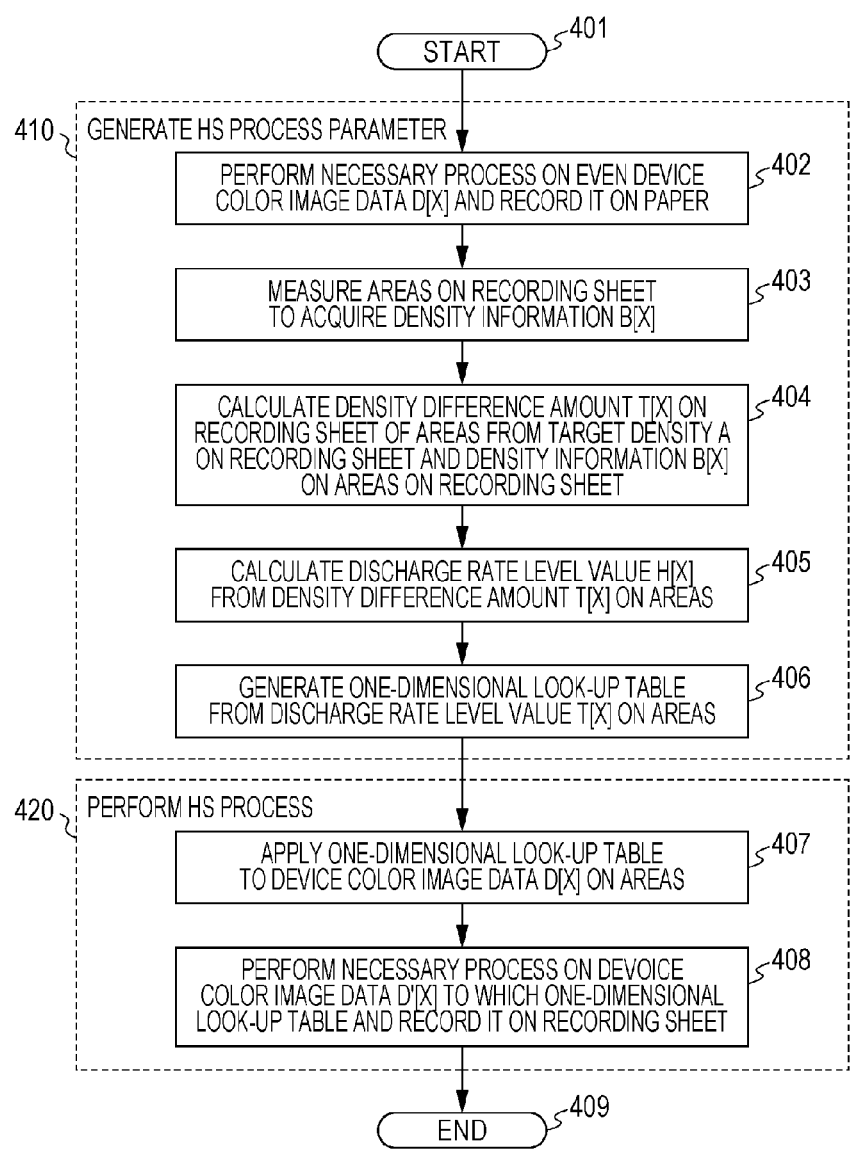
FIG. 8 is a flowchart illustrating an HS process to be performed in an embodiment of the present invention.

FIG. 8 is a flowchart illustrating step to be performed by the CPU 211 to generate a parameter on a conversion table to be used in the picture HS processing unit 305 or the character HS processing unit 310 according to this embodiment. Such parameter generation processing according to this embodiment may be performed forcibly or selectively when a printer is manufactured, after a printer has been used for a predetermined period of time or after a predetermined amount of recording is performed. For example, it may be performed before a recording operation is performed. In other words, the processing may be performed as a what-is-called calibration, which may update table parameters contained in a conversion table. Processing to be performed in the picture HS processing unit 305 will be described below. The character HS processing unit 310 operates similarly to the picture HS processing unit 305.

When the table parameter generation processing in the picture HS processing unit 305 is started, ink is first ejected from all nozzles of the recording heads illustrated in FIG. 1 in step 402 so that a measurement image is recorded on a recording medium. In this case, a measurement image with a signal value 0 or 255 is used for each of K, C, M, and Y. For example, a measurement image for measuring the color density of cyan ink may exhibit (K, C, M, Y)=(0, 255, 0, 0), and a measurement image for measuring the color density of magenta ink may exhibit (K, C, M, Y)=(0, 0, 255, 0).

A measurement image recording method will be described below with reference to FIG. 5A. In order to record a measurement image, image data (R, G, B) is input to the picture ink color converting unit 304 without processing in the picture input color converting unit 303 (hereinafter, will be called device color image data D[X]). This path is denoted by a dashed line 315 in FIG. 7 as a bypass path. The processing with a bypass path may be implemented by preparing a table in which input value=output value for example, and inputting the device color image data D[X] to the picture ink color converting unit 304. However, independent of X, an input value may be directly output.

After that, the picture HS processing unit 305, picture TRC processing unit 306, and picture quantization processing unit 307 perform same processing as that on normal data. The quantized data printing unit 314 records the measurement image in the recording medium 106. At this point, the picture ink color converting unit 304 converts image data of an measurement image represented by (R, G, B) to image data (K, C, M, Y) with color signals of inks. In this case, for example, when image data of measurement image is (R, G, B)=(0, 255, 255), the signal values are converted to image data (K, C, M, Y)=(0, 255, 0, 0), that is data for recording cyan ink 100%. After that, the picture HS processing unit 305 and subsequent processing converts the image data (K, C, M, Y)=(0, 255, 0, 0) to dot data illustrated in FIG. 5B, which are then recorded.

Figures 9A, 9B:
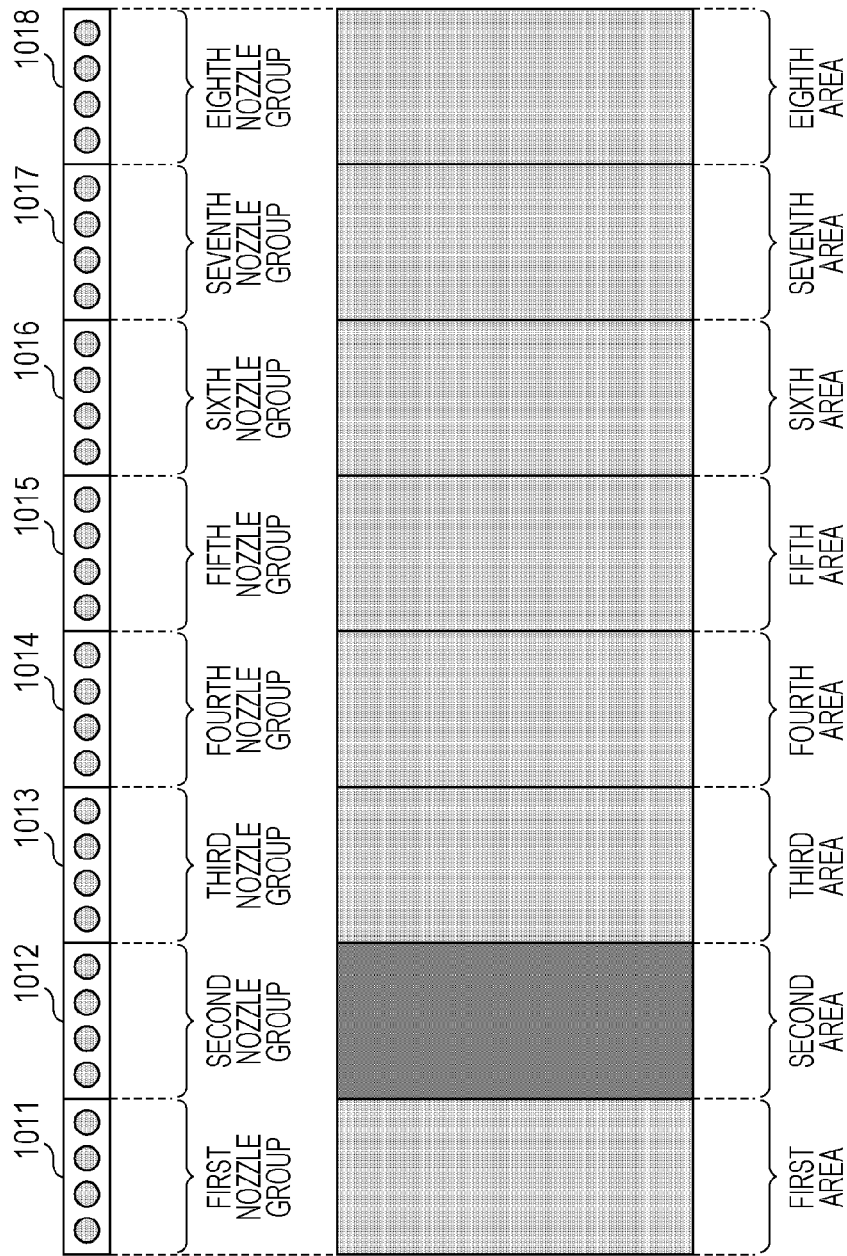
FIGS. 9A and 9B illustrate nozzle groups within a recording head and corresponding recording areas.

X refers to information describing the positions of every four nozzles of each color in an x-direction in the recording heads 101 to 104 illustrated in FIG. 1. The HS process according to this embodiment performs processing on one nozzle group of four nozzles of a plurality of nozzles. Every image data corresponding to one nozzle group is to be corrected. The device color image data D[X] refers to image data to be recorded for four nozzles corresponding to X of each ink color. FIG. 9A illustrates the state. For simplicity, recording heads each having a nozzle group including four nozzles are illustrated. A one-dimensional look-up table for performing an HS process is assigned to each of the nozzle groups.

FIG. 9B illustrates a recorded state of a measurement image in step 402 above. The four nozzles corresponding to a second area of the nozzles of the recording heads 101 which eject ink have a higher discharge rate than normal. Thus, a color density difference occurs in the second area corresponding to the nozzles having a higher discharge rate than normal, and a measurement image having a different color density from a normal color density in other areas is recorded.

Referring back to FIG. 8, in step 403, a measurement image recorded on the recording medium 106 in step 402 is measured by the scanner 107, and color density information B[X] corresponding to each area [X] is thus acquired. According to this embodiment, the resolution of the scanner, that is, the arrangement pitch of reading elements provided in the scanner are not particularly limited. It may be higher or lower than the recording resolution 1200 dpi of the recording heads. The scanner 107 may not necessarily be of a full-line type like the recording heads, as illustrated in FIG. 1. It may be of a serial type which may perform colorimetry in predetermined cycles by moving in the x-direction in FIG. 1. A scanner provided separately from a printer may be used. In this case, for example, the scanner and the printer may be signal-connected so that a measurement result may be automatically input from the scanner. Furthermore, the color density information B[X] may not necessarily be RGB information but may be information in any format such as L*a*b* measured by a colorimeter, for example. Independent of its form and its resolution, any colorimetry is applicable to this embodiment as far as a correct density information B[X] may be acquired for an area corresponding to four nozzles by performing processing such as averaging. In this way, the device color image data D[X] is recorded on a recording medium as a measurement image and is recorded by the recording heads 101 illustrated in FIG. 1. Then, the color density information B[X] is acquired by the scanner 107 for each area (unit area) corresponding to a nozzle group (including four nozzles in this embodiment). The recording head 101 is a recording head which ejects K ink, and device color image data D[X] is a measurement image acquired by ejecting K ink only if it exhibits (K, C, M, Y)=(255, 0, 0, 0).

The following description assumes that the first area is X=1, the second area is X=2, the color density information of the first area is B[1]=(R1, G1, B1), and the color density information of the second area is B[2]=(R2, G2, B2).

In step 404, a color density fluctuation amount T[X] of each area [X] is calculated from a target color density A=(Rt, Gt, Bt) and the color density information B[X] acquired in step 403. Here, the target color density A refers to a target colorimetric value when a signal (K, C, M, Y)=(255, 0, 0, 0) for K ink, for example, is recorded and undergoes colorimetry in a printer of this embodiment. In reality, it may be a result of colorimetry in the scanner 107 on an image recorded by using nozzles having a normal discharge rate.

First of all, a value of a density difference S[X] that is a difference between the color density color information B[X] and a target color density A is calculated.

Color density difference $S[1]=B[1]-A=(R1-Rt, G1-Gt, B1-Bt)$

Color density difference $S[2]=B[2]-A=(R2-Rt, G2-Gt, B2-Bt)$

Figure 10:
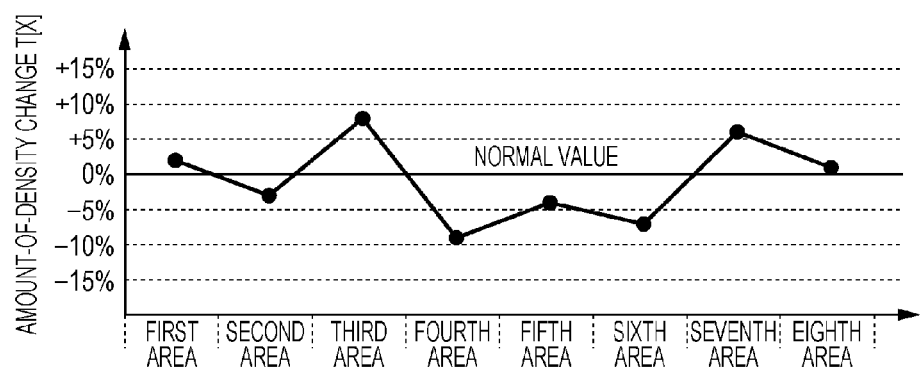
FIG. 10 is a graph illustrating color density differences from a normal discharge rate of the nozzle group for areas.

In this embodiment, because K ink is ejected at a normal discharge rate in the first area, basically R1=Rt, G1=Gt, B1=Bt. As a result, the color density difference S[1]=0. On the other hand, because K ink is ejected at a higher discharge rate than normal in the second area, a lower (higher color density) value than the target color density A(Rt, Gt, Bt) is detected. Next, a color density fluctuation amount T is acquired from the color density difference S. This relatively exhibits a fluctuation amount of a discharge rate compared with a target color density (normal discharge rate) and is indicated by an increase or decrease proportion from the normal discharge rate. FIG. 10 illustrates a relationship between color density fluctuation amount T[X] and area [X]. The color density fluctuation amount T may be determined on the basis of table data prestoring relationships between color density differences S and color density fluctuation amounts T as table data table. Alternatively, for example, it may be acquired as a function like color density difference S[X]/target color density A.

Figure 11:
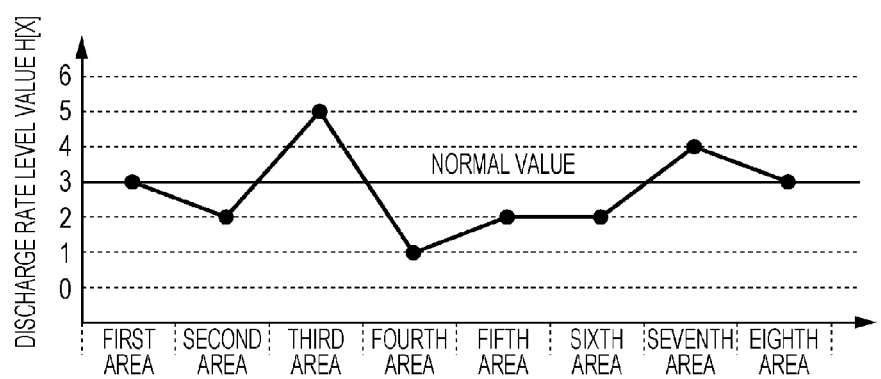
FIG. 11 is graph illustrating discharge-rate level values calculated from the color density differences of nozzle groups for areas.

Referring back to FIG. 8, in step 405, a discharge-rate level value H[X] is determined from the color density fluctuation amount T[X] of each area [X]. According to this embodiment, a color density fluctuation amount T[X] is simply determined about a threshold value, and the discharge-rate level value H[X] is determined in accordance with the result. A plurality of one-dimensional look-up tables based on discharge rates are held in advance in the HDD 203 in the host PC 200, and a one dimensional look-up table to be adapted is determined for each area in accordance with the determination result regarding the discharge-rate level value H[X]. FIG. 11 illustrates a relationship between discharge-rate level value H[X] and area [X]. For example, an area [8] having a discharge rate+2% from a normal discharge rate in FIG. 10 has a discharge-rate level value of 3 in FIG. 11. This results in processing of applying the third one dimensional look-up table held in the HDD 203 to the area [8]. By the way, the determination of one dimensional look-up table for each area from its color density fluctuation amount T[X] may not only be based on a threshold value, but a discharge-rate level value H[X] may be dynamically generated in accordance with the color density fluctuation amount T[X].

In step 406, from one dimensional look-up table having discharge-rate level values H[X] determined for areas [X], an HS table parameter to be used in the picture HS processing unit 305 is generated and is set in the RAM 212. The thus acquired HS table parameter is applied to the device color image data D[X] to generate corrected device color image data D'[X] in step 407. After that, in step 408, the picture TRC processing unit 306 and picture quantization processing unit 307 perform the same processing as that on normal data on the image data. The quantized data printing unit 314 records the measurement image on the recording medium 106 so that a recorded image having a even color density in each area [X]. One one-dimensional look-up table is assigned to four nozzles in this embodiment, where the number of nozzles may be changed. Results of determination of discharge rates for the entire recording head are prestored in the HDD 203 in the host PC 200. They are used as parameters to be referred for switching a quantization process, which will be described below.

As described above, the HS process generates a parameter which may reduce the number of dots to half as indicated by the region 1062 in FIG. 6B for the nozzles 10121 to 10124 of the recording head 101 illustrated in FIG. 6A. For the nozzles 10111 to 10114 in the recording head 101, a parameter is generated which does not change the number of dots as indicated by the region 1061 in FIG. 6B. In other words, as the discharge-rate level value increases from a normal value, the number of dots to be recorded on a recording medium decreases. On the other hand, as the discharge-rate level value decreases from the normal value, the number of dots to be recorded on a recording medium increases.

As described above, the number of dots may be controlled by reflecting a correction by the HS process on each area [X]. This may provide approximately even color density of each area [X]. In the past, an uneven color density is significant when a picture, for example, is printed evenly on paper. For that reason, the HS process has been used in a printing system that mainly handles picture images. However, the HS process is also useful for a character image data having a smaller area to which ink is ejected on paper than a picture. For example, when a document image including characters written in a thick character font or larger characters is printed, an uneven color density of a recording head for K ink differentiate the color densities among characters. As a result, the uneven color density may be visually recognized on entire paper. When an image entirely having characters is printed, uneven color density may be visually recognized as occurring on a picture image. For that reason, according to this embodiment, the HS process is performed on not only picture image data but also character image data so that high quality printing may be achieved.

Next, differences between the picture HS processing unit 305 and the character HS processing unit 310 will be described. Having described an HS process above, different HS processes may be required in the picture HS processing unit 305 and the character HS processing unit 310 since the legibility and/or ink ejection characteristic vary between picture image data and character image data due to their resolutions.

Figure 12:
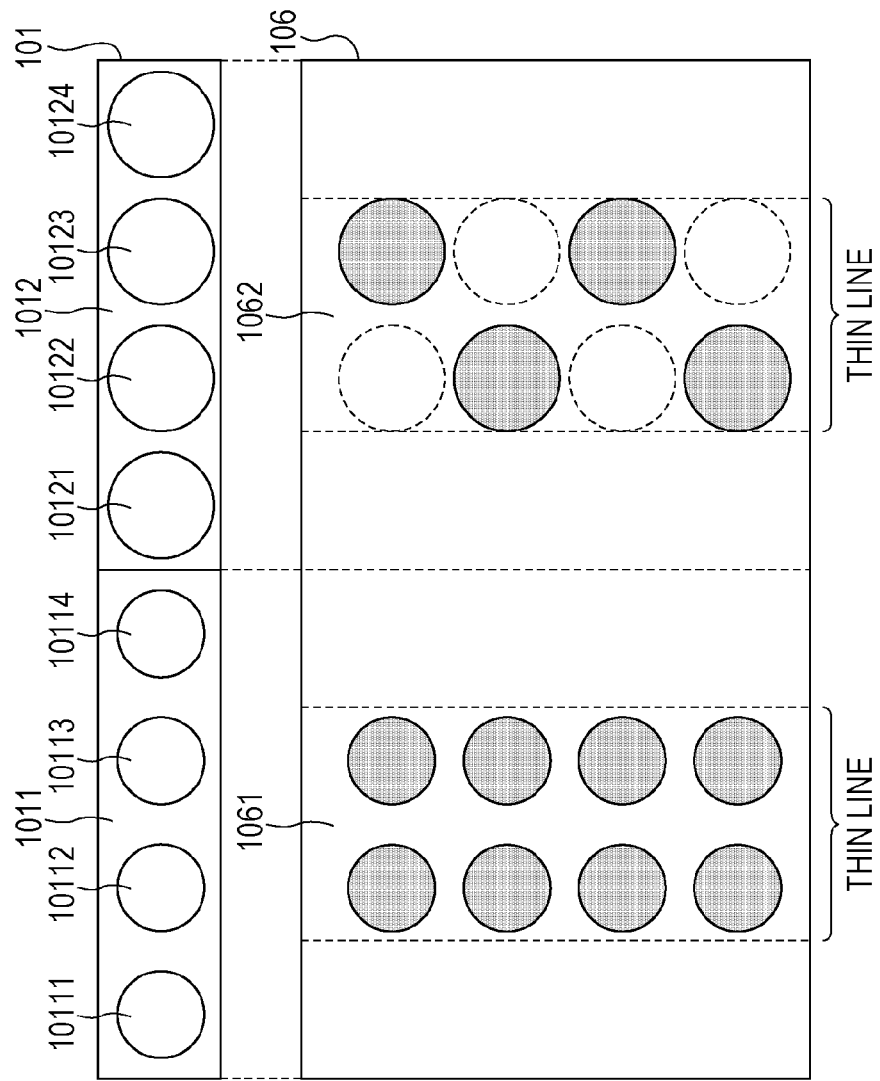
FIGS. 12A and 12B illustrate dot arrangement patterns on thin lines in a normal HS process.
Figure 13:
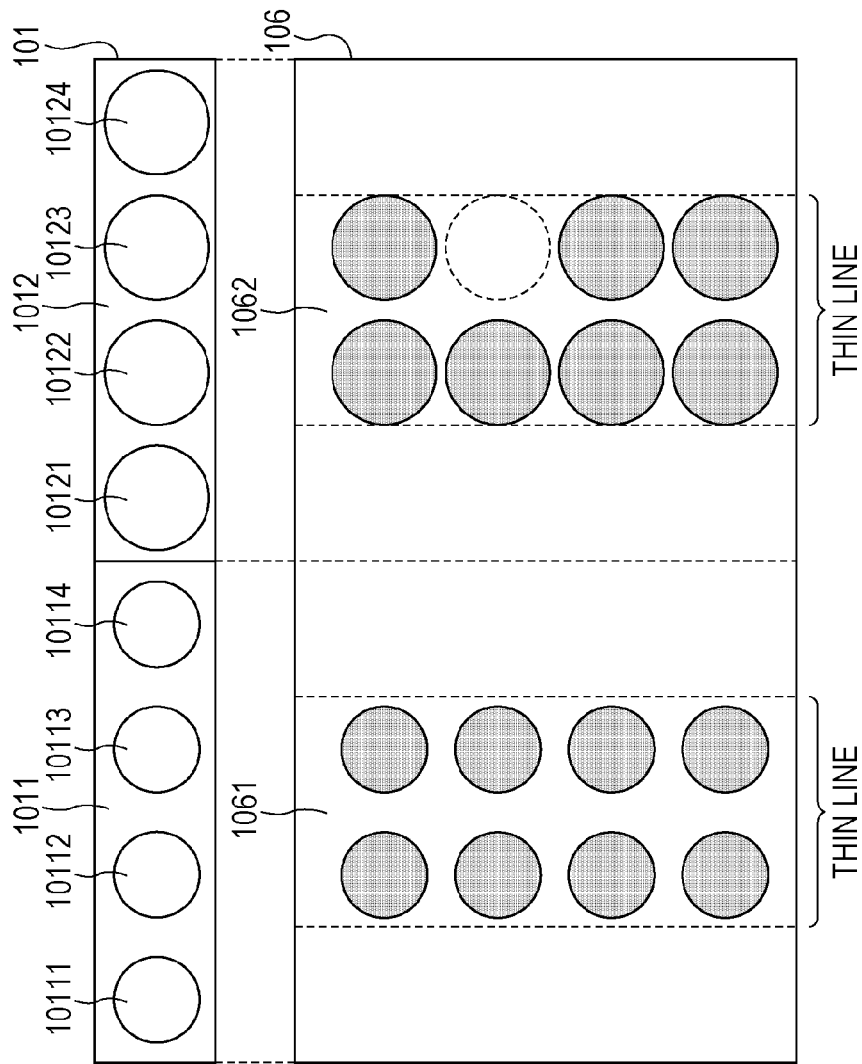
FIGS. 13A and 13B illustrate dot arrangement patterns on thin lines in a character HS process.
Figure 14:
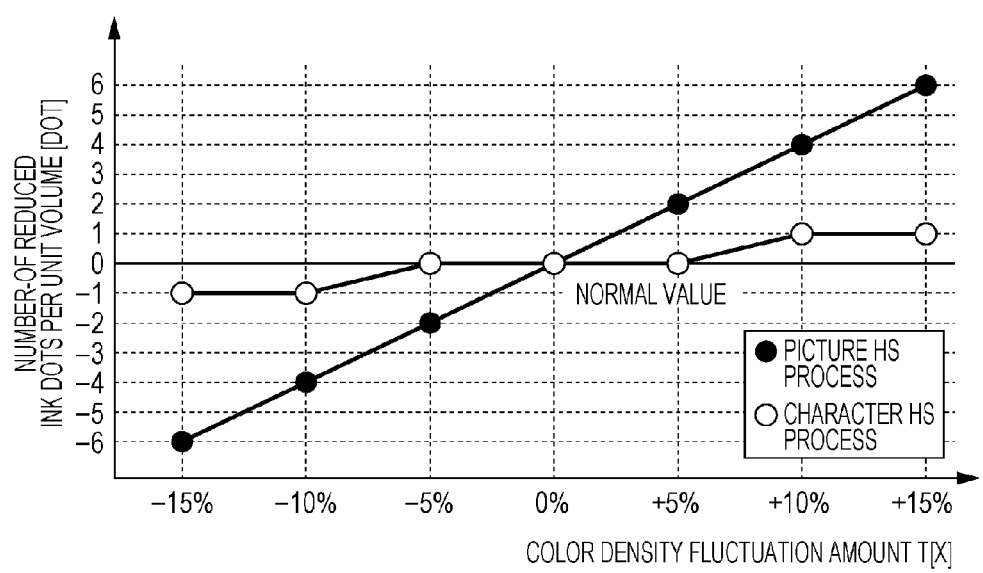
FIG. 14 is a graph illustrating the numbers of reduced ink dots in a picture HS process and a character HS process according to an embodiment of the present invention.

One reason for separately providing the picture HS processing unit 305 and the character HS processing unit 310 is the reproducibility of edges of characters. As illustrated in FIGS. 6A and 6B, performing an HS process provides an even color density for each unit area. However, because of thin ink dots, printed thin lines such as characters may have uneven edges. For example, FIGS. 12A and 12B illustrate how a thin line is rendered with two nozzles. The left side of FIG. 12B illustrates a dot arrangement pattern in a normal dot size and without an HS process, and the right side of FIG. 12B illustrates a dot arrangement pattern as a result of an HS process because of its large dot size. As illustrated in the right side of FIG. 12B, when an HS process is performed, the width of a thin line rendered on paper is uneven, and the edge is also uneven, which may sometimes lower the sharpness of the characters and/or cause a straight line to appear crooked. In such a case, precise correction of the color density of characters through an HS process may have a larger adverse edge effect as described above, lowering character legibility. On the other hand, a picture HS process may generate such edges in an image overwhelmingly less frequently than a character HS process. Conversely, in order to reproduce the gradation of a picture, correct color density adjustment may be required. In view of such characteristics of a character image and a picture image, the character HS process reduces the number of ink dots more than the picture HS process. Alternatively, the number of dots to be increased for a low color density may be reduced. The state is illustrated in FIG. 13B. A normal HS process reduces four ink dots while a character HS process reduces only one. In other words, the degree of correction by the character HS processing unit 310 is made lower than the degree of correction by the picture HS processing unit 305. FIG. 14 illustrates an example of the degree of correction. As described above, in a normal HS process, as the color density fluctuation amount increases, the number of ink dots to be reduced is increased. However, according to this embodiment, the number of ink dots to be reduced or increased in the character HS process is set to be lower than a picture HS process. Because the area covered by characters printed on paper is sufficiently smaller than a picture area, an uneven color density occurring in a character part may exhibit lower legibility to human eyes than an uneven color density occurring in a picture part. Thus, reducing the number of ink dots to be reduced or increased by the picture HS process as illustrated in FIG. 14 in a character HS process may keep the sharpness of edges of characters by correcting an uneven color density of a character part minimally to a degree that is not visually recognizable.

As another example, when the ink discharge rate of a recording head increases (with a high color density fluctuation amount T), the character HS processing unit 310 may not perform the ink dot reduction until the amount of ejected ink to an arbitrary medium reaches a maximum and reduces the number of ink dots which may overflow when the amount of ejected ink is beyond the maximum. As described above, an uneven color density in character image data may exhibit lower legibility than an uneven color density in picture image data. For that reason, the character HS processing unit 310 attaches importance to reproducibility of edges of characters and does not perform an HS process under the limit at which the amount of ejected ink overflows and keeps the edges of characters thereby. When the color density fluctuation amount T increases and the amount of ejected ink reaches its limit, the HS process is performed by preventing overflow of ink. This may prevent a failure in the recording device caused by ink overflow while keeping the edges of characters at a maximum.

The second reason for separately providing the picture HS processing unit 305 and the character HS processing unit 310 is the reproducibility of thin lines of characters. One HS table parameter is held for four nozzles as in FIGS. 6A and 6B. However, character image data may sometimes include thin lines to be formed with fewer nozzles than four nozzles as in FIG. 12A. As illustrated in FIG. 6B, controlling the ejection/non-ejection of ink dots in the region 1062 for four nozzles may result in a continuous area on which ink dots are not ejected for a thin line. This may cause an adverse effect that a thin line is broken on paper. Accordingly, the character HS processing unit 310 desirably stores or holds one HS table parameter for two nozzles in more detail than FIG. 6B, for example. On the other hand, picture image data has gradation which highly affects on its image quality and may not require more control over an HS process with fewer nozzles than character image data. Also, in order to reduce the space for HS table parameters, the picture HS processing unit 305 may be required to hold one HS table parameter for more nozzles, compared with the character HS processing unit 310. (The number of dots in one area is higher in a picture HS process.) Thus, the picture HS processing unit 305 and the character HS processing unit 310 are separately provided to change their HS table parameters so that the space for HS table parameters of an entire HS process may be reduced while keeping the reproducibility of thin lines of a character part.

The third reason for separately providing the picture HS processing unit 305 and the character HS processing unit 310 is a difference in permeability of dye-based ink and pigment-based ink. A printer containing dye-based black ink and pigment-based black ink generally use dye-based black ink for printing a picture part and pigment-based black ink for printing a character part. Recording heads for dye-based ink and recording heads for pigment-based ink are generally manufactured through same steps in view of their manufacturing costs. Thus, the recording heads have an equal nozzle diameter, and the sizes of ink dots to be ejected are substantially equal. However, because dye-based ink is more permeate a medium than pigment-based ink, ink may spread on paper, resulting in a larger dot diameter. On the other hand, pigment-based ink is more resistant to permeate a medium than dye-based ink and may easily remain on its surface. Thus, its dot diameter on paper is not as large as dye-based ink. As a result, how a plurality of inks ejected on paper overlap varies between pigment-based ink and dye-based ink, and their color densities per unit area may vary in accordance with the number of discharges. In other words, these characteristics may cause color density variations between unit areas. Thus, it may be required to separately provide an HS processing unit for a picture part with dye-based ink and an HS processing unit for a character part with pigment-based ink to cause them to perform different kinds of processing.

The fourth reason for separately providing the picture HS processing unit 305 and the character HS processing unit 310 is a difference in color density for input resolutions of picture image data and character image data. Having described according to this embodiment that picture image data and character image data are assumed to have a same resolution, they may have different resolutions for the processing above. As the resolution of a character image increases, the legibility of the characters improves. On the other hand, because the image quality of a picture image is more influenced by its gradation than its resolution, a picture image may not be required to have as high resolution as a character image. In other words, setting the resolution of a picture image data lower than the resolution of character image data may reduce the data space for entire image data while keeping the legibility of characters therein and thus reduce the entire data space and reduce a transfer load of the image data. For example, it is assumed that the resolution of character image data is 1200 dpi, and the resolution of picture image data is 600 dpi. Following the processing flow in FIG. 7, the processing up to the quantization process is performed on both of the data pieces, and the picture quantization processing unit 307 enlarges the picture image data from 600 dpi to 1200 dpi. In this operation, because the picture image data is processed as having 600 dpi, the processing load may be reduced. Next, the quantized data synthesizing unit 313 synthesizes image data piece having an equal resolution, and the printing unit 314 prints the quantized data. Alternatively, the picture/character receiving unit 214 may enlarge the resolution of the picture image data from 600 dpi to 1200 dpi. In this case, the resolution enlarging method may be a generally known nearest neighbor method or a bicubic interpolation method, or any method may be applied in this embodiment. Here, printing image data pieces having different resolutions result in different dot arrangement patterns of ink ejected on paper even though they have an equal pixel signal value. For example, when an intermediate color is reproduced by ejecting arbitrary ink with (K, C, M, Y)=(192, 0, 0, 0), the dot arrangement patterns are different between 1200 dpi and 600 dpi in the quantization processing unit. Thus, ink dots may overlap differently in a unit area. This results in color density variations of ink ejected on paper between the high resolution and the low resolution. According to this embodiment, further in view of the point, HS processes for picture image data and character image data apply different HS table parameters when the picture image data and character image data having different resolutions are to be processed. Thus, when a plurality of image data pieces having different resolutions are to be handled, uniform color density corrections may be performed by performing different HS processes even with different dot arrangement patterns.

As described above, the present invention separately includes the picture HS processing unit 305 and the character HS processing unit 310 so that the image quality of picture image data and character image data may be increased by performing processes corresponding to the picture image data and character image data. The four examples above may be combined arbitrarily. An example will be given in which the degree of correction of an HS process in consideration of reproducibility of edges of characters is determined in an printing apparatus including recording heads with dye-based ink and pigment-based ink. In this case, the degree of correction of the character HS processing unit 310 may be stronger than a printing apparatus with dye-based ink only. This is because the ink dot size of pigment-based ink to be printed on paper is smaller, compared with a printing apparatus with dye-based ink only and therefore the sharpness of edges does not decrease easily even when the number of ink dots is reduced in a character HS process. In this way, the degree of correction of a character HS process may be freely determined in accordance with the ink ejection characteristic and resolution of the subject data. An arbitrary combination of degrees of correction of HS processes may be determined empirically.

Having described according to this embodiment that the character image data is 8-bit maltivalued image data, it may be bi-level image data. For example, it is assumed that a black pixel has signal value 1 and a white pixel has signal value 0. The character ink color converting unit 309 defines an ejection characteristic of ink for black pixel (K)=(1) as (K, C, M, Y)=(240, 0, 0, 0). The character HS processing unit 310 may perform an HS process by reducing the K value of the ejection characteristic of a recording head for K ink as the color density increases and increasing the K value as the color density decreases. After that, the quantized data is printed by following the processing flow in FIG. 7.

Having described according to this embodiment that the subject character image data is 8-bit, 1-channel monochrome image data, for example, it may be 8-bit, RGB 3-channel image data for performing the same processing above thereon. Thus, the character image data may include not only black characters but also color characters. For example, With (R, G, B)=(255, 0, 255) magenta, the magenta of picture image data and the magenta of the character image data may sometimes be required to be printed differently. For the picture image data, ink color conversion of an ink combination close to a surrounding color is performed to increase the gradation to the surrounding color (detail numerical values will be omitted here). On the other hand, the character image data is printed with magenta ink only for higher legibility. After that, the quantized data is printed by following the processing flow in FIG. 7. In order to print magenta in a picture part and magenta in a character part as different colors on paper, input image data is separated into picture image data and character image data. As described above, in order to reproduce a thin line as in a character, color misregistration between different inks may occur. Thus, even color characters are desirably printed with homochrome color ink.

In this way, according to this embodiment, the host PC 200 separates an input image into picture image data and character image data and transfers them to the printer 100. In the printer 100, the picture image data and the character image data separately undergo input color conversion processing, ink color conversion processing, an HS process, a TRC process, and quantization processing. After that, the quantized image data pieces are synthesized, and the quantized image data is printed. This allows the picture image data and the character image data to undergo ink color conversion processing according to their desirable image qualities. Performing an HS process on each of picture image data and character image data may reduce uneven color density due to different discharge rates of recording heads.

Second Embodiment

Figure 15:
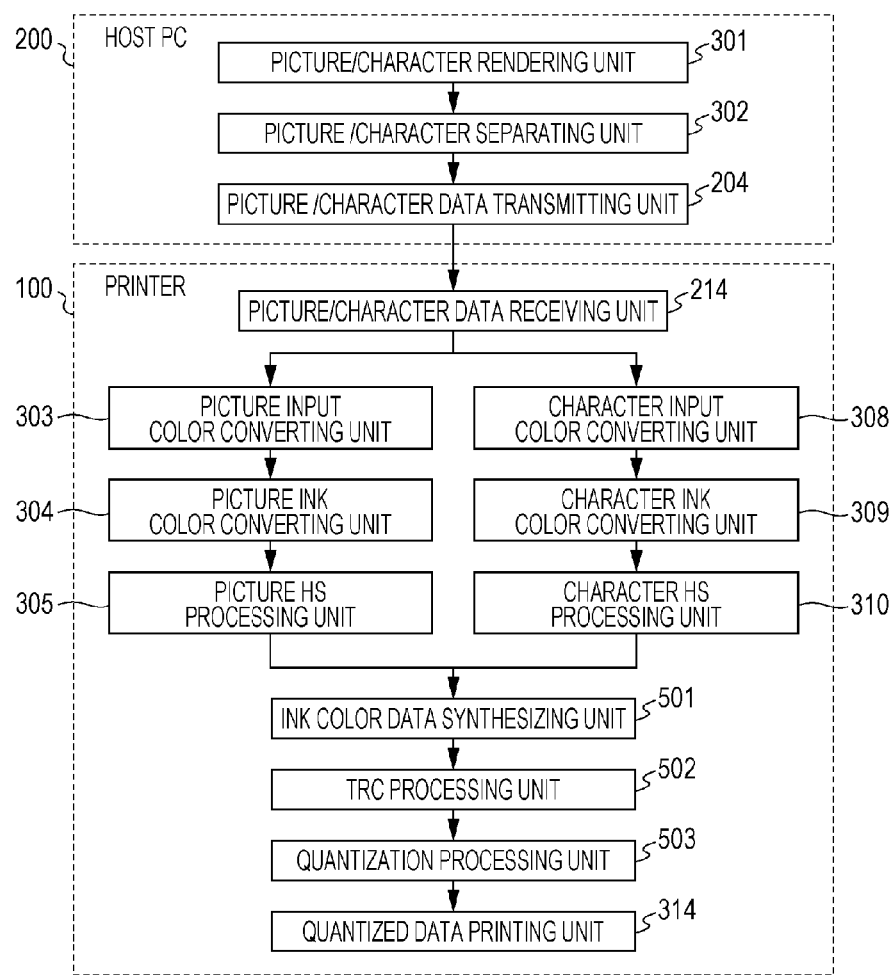
FIG. 15 is a block diagram illustrating a recording system which synthesizes picture data and character data after an ink color conversion according to an embodiment of the present invention.

According to the first embodiment, the separated picture image data and character image data are synthesized after the quantization process thereon ends. According to this embodiment, the two image data pieces are synthesized subsequently to HS processes thereon. The processing flow will be described with reference to FIG. 15. The processing by the picture HS processing unit 305 and the character HS processing unit 310 to be performed in the printer 100 is the same as that of the first embodiment. According to the second embodiment, two image data pieces are synthesized in the ink color data synthesizing unit 501 after they undergo an HS processes. Next, the synthesized image data undergoes a quantization process through the TRC processing unit 502 and quantization processing unit 503. The quantized data is transmitted to the quantized data printing unit 314 and is printed, as in the first embodiment.

According to the first embodiment, different TRC processes and quantization processes are performed separately on picture image data and character image data. However, according to the second embodiment, synthesizing two image data pieces immediately after the HS processes may require one TRC process and one quantization process to be performed thereon. When the same TRC processes and the same quantization processes are performed on picture image data and character image data, those processes may be performed after the two data pieces are synthesized. This may increase the processing speed.

Third Embodiment

Figure 16:
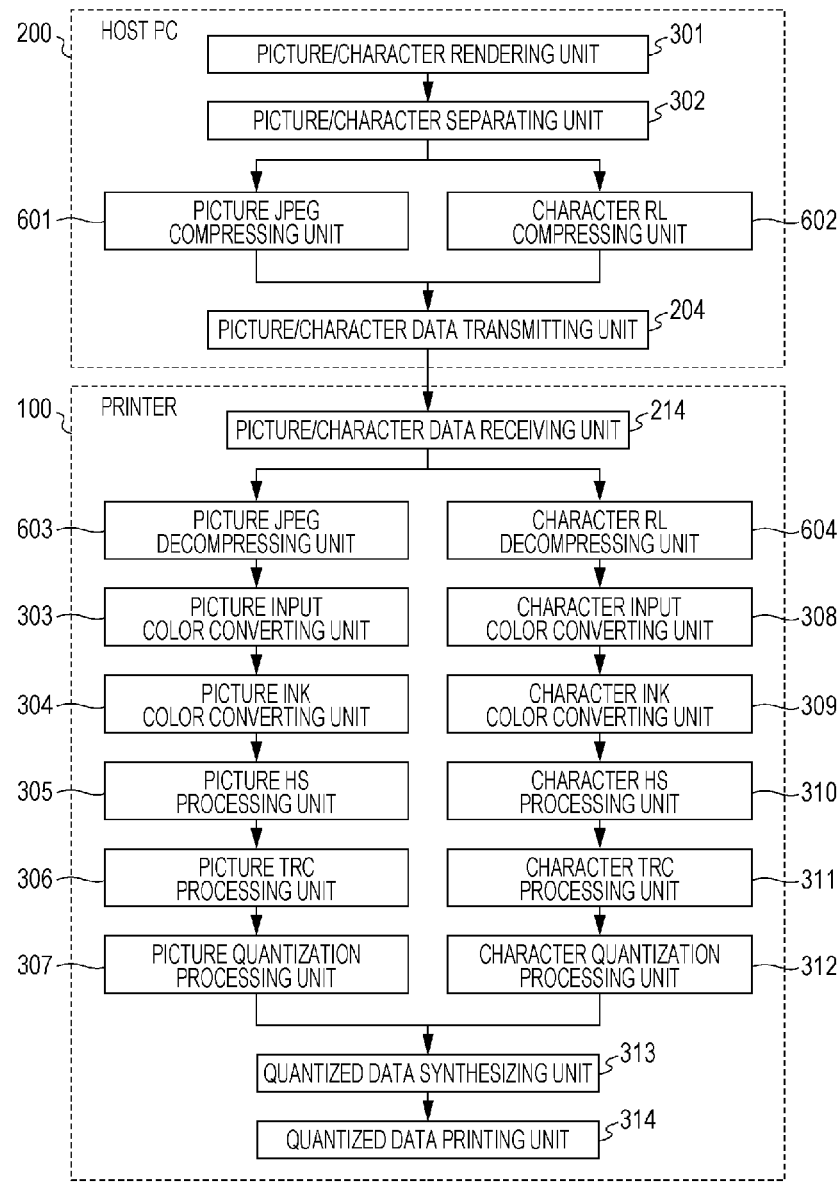
FIG. 16 is a block diagram illustrating a recording system which compresses picture data and character data and transfers them to a printer according to an embodiment of the present invention.

According to the first embodiment, the separated picture image data and character image data are uncompressed when transferred to the printer 100. Because it may impose a load on the transfer processing, the two image data pieces are compressed in the host PC 200 for transferring them according to this embodiment. The processing flow will be described with reference to FIG. 16. Picture image data as a result of the separation by the picture/character separating unit 302 is compressed to JPEG data in a picture JPEG compressing unit 601. On the other hand, the character image data undergoes RUN LENGTH compression in a character RL compressing unit 602. The compressed two image data pieces are transferred to the printer 100 by a picture/character data transmitting unit 204. In this case, the image data transferring method may transfer the data pieces separately or may connect and synthesize the two image data pieces into one data piece and transfer it.

Next, the picture/character data receiving unit 214 in the printer 100 receives the compressed image data. The received image data is separated into the picture image data and the character image data, which are then transmitted to a picture JPEG decompressing unit 603 and a character RL decompressing unit 604, respectively. The picture image data and character image data are decompressed there and then, like the first embodiment, are processed in the picture and character input color converting units, ink color converting units, HS processing units, TRC processing units, and quantization processing units. The two quantized data pieces are synthesized in the quantized data synthesizing unit 313. Finally, the quantized data is transmitted to the quantized data printing unit 314 and is printed.

In this way, compressing picture/character image data in an I/F between the host PC 200 and the printer 100 may reduce the transfer load. According to this embodiment, JPEG compression is performed on picture image data. However, the present invention is not limited thereto, and any of other irreversible compressions may be performed. Performing irreversible compression on picture image data may reduce the data space overwhelmingly. On the other hand, the compression on character image data is not limited to RUN LENGTH compression, but any of other reversible compressions may be performed. Character image data may require reproduction of details therein. Performing irreversible compression on a small character may crush the character when the data is decompressed. For that reason, a reversible compression may be required thereon. According to this embodiment, the data space may be greatly reduced even when a reversible compression is performed in consideration of cases where the character image data is bi-level data or 1 channel monochrome data.

Fourth Embodiment

Figure 17:
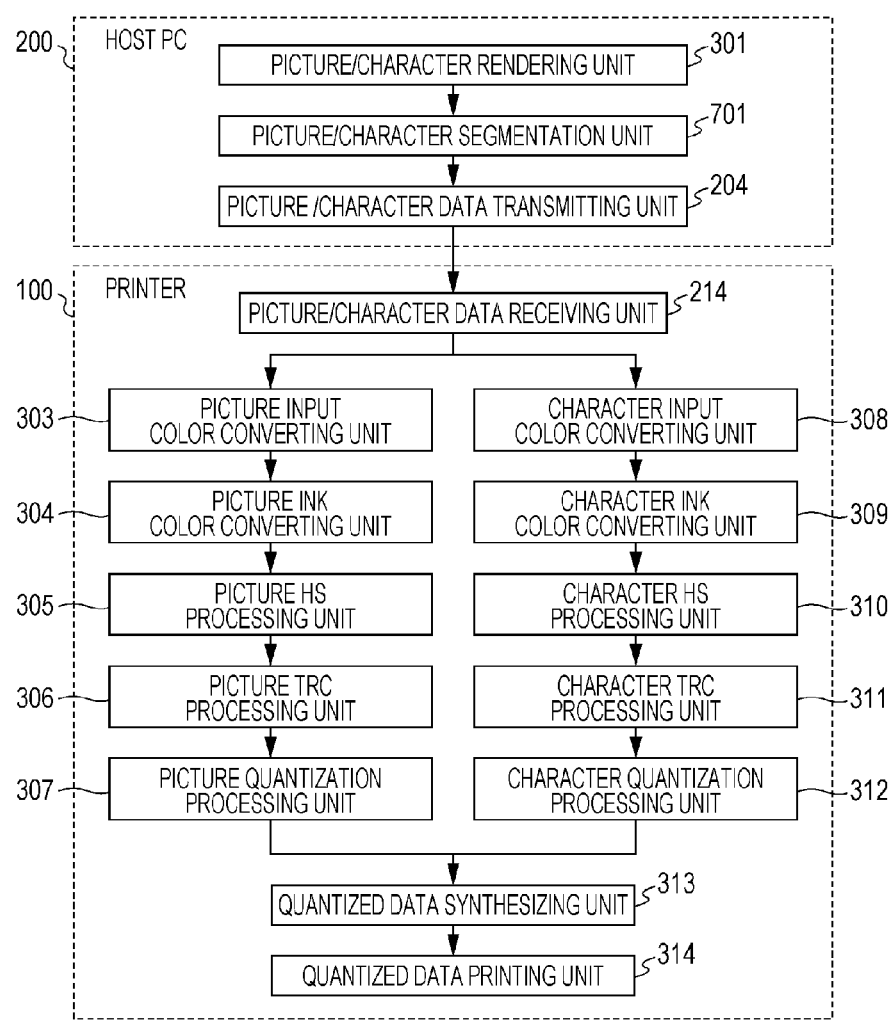
FIG. 17 is a block diagram illustrating a recording system which segments picture data and character data with an image area segmentation process according to an embodiment of the present invention.

According to the first embodiment, image data in which picture image data and character image data are separated in advance is used as input image data. According to a fourth embodiment, image data in which a picture part and a character part are mixed is to be handled. For example, it may be image data acquired by reading a document in which a picture and characters are mixed with a reading apparatus such as a scanner. Alternatively, it may be a PDF file acquired by synthesizing picture image data and character image data into one layer. FIG. 17 illustrates the processing flow. Input image data rendered by the picture/character rendering unit 301 in the host PC 200 undergoes segmentation in a picture/character segmentation unit 701.

The image area segmentation process may be performed by a generally known method. For example, input image data may be separated into a picture part and a character part on the basis of an edge amount and a pixel signal value of the input image data. This method applies an edge extraction filter on each pixel of input image data and determines whether the edge amount is equal to or higher than a predetermined threshold value or not. Whether an RGB signal value of each pixel is equal to or lower than a predetermined threshold value or not is further determined. If the edge amount is equal to or higher than a threshold value and the RGB signal value is equal to or lower than a threshold value, the pixel may be determined as containing a black character with a high edge. If not, the pixel is determined as a picture part. According to the first to third embodiments, character image data separated in advance undergoes the input color conversion, ink color conversion, HS process, TRC process, and quantization process as it is. According to the fourth embodiment, performing the image area segmentation process may change the threshold values for the determination. As a result, a character to be handled as character image data may be changed arbitrarily as in a case where black characters are only to be processed as character image data or characters including color characters are to be processed as character image data.

The application of an image processing apparatus and method according to the present invention may allow printing a picture, an image picture and a character image with their corresponding inks in corresponding way of using the inks for high quality recording.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-065662, filed Mar. 22, 2012, which is hereby incorporated by reference herein in its entirety.

What is claimed is:

1. An image processing apparatus comprising:
an acquiring unit which acquires combined image data and separates the combined image data into a first image data indicating a first gray-scale value of a first image having a first attribute and a second image data indicating a second gray-scale value of a second image having a second attribute that is different from the first attribute, the first attribute indicating that the first image data is for at least one picture and the second attribute indicating that the second image data is for at least one character;
a picture correcting unit which corrects the first gray-scale value acquired by the acquiring unit on a basis of information on an ejection characteristic of a discharge head, the discharge head ejecting liquid to be used for forming the first image and the second image on a recording medium with dots;
a character correcting unit which corrects the second gray-scale value acquired by the acquiring unit by a different degree of correction from a degree of the correction for the first gray-scale value by the picture correcting unit, on a basis of the information on the ejection characteristic of the discharge head; and
a generating unit which generates first dot data indicating the presence of formed dots for forming the first image on the basis of the first gray-scale value corrected by the picture correcting unit and second dot data indicating the presence of formed dots for forming the second image on the basis of the second gray-scale value corrected by the character correcting unit.

2. The image processing apparatus according to claim 1, wherein the generating unit uses a quantization process by dithering to generate the first dot data and the second dot data.

3. The image processing apparatus according to claim 1, wherein the first image data and the second image data are image data exhibiting multi-level gray-scale values.

4. The image processing apparatus according to claim 1, wherein the acquiring unit receives and decompresses the first image data and the second image data.

5. The image processing apparatus according to claim 1, wherein the picture correcting unit reduces the first gray-scale value and the character correcting unit reduces the second gray-scale value, and the degree of correction on the first gray-scale value is higher than the degree of correction on the second gray-scale value.

6. The image processing apparatus according to claim 1, wherein the ejection characteristic is at least one discharge rate of the ejection head.

7. The image processing apparatus according to claim 1, wherein the picture correction unit and the character correction unit separately process the first image data for at least one picture and the second image data for at least one character, respectively, using one or more different processes, thereby at least one of:
improving image quality of the first image and/or the second image, improving or increasing legibility of the first image and/or of the second image, differentiating an amount of ejection of black ("K") ink between the first image and the second image, allowing one or more characters of the second image to be printed thicker than in a situation where the first image data and the second image data are processed together and/or processed similarly or identically, decrease blur of the first image and/or the second image as compared to a situation where the first image data and the second image data are processed together and/or processed similarly or identically, improving the reproducibility of one or more edges and/or thin line(s) of the first image and/or the second image, compensating for color density variation(s) of at least one dye-based ink of the first image and for color density variation(s) of at least one pigment-based ink of the second image, compensating for a difference in permeability of at least one dye-based ink of the first image and of at least one pigment-based ink of the second image, providing different resolutions for the first image and the second image to reduce a transfer load of the first and second image data and/or to reduce required data space for storing and/or processing the first image data and the second image data while maintaining the legibility of the second image, and reducing uneven color density due to different discharge rates of recording heads.

8. The image processing apparatus according to claim 7, wherein the picture correction unit further operates to perform one or more processes corresponding to the first image data for the at least one picture and the character correction unit further operates to perform one or more processes corresponding to the second image data for the at least one character.

9. The image processing apparatus according to claim 8, wherein: (i) the one or more processes performed by the picture correction unit include at least one of: picture decompression processing, picture input color conversion processing, picture ink color conversion processing, picture Head Shading ("HS") processing, picture Tone Reproduction Curve ("TRC") processing, and picture quantization processing, and
the one or more processes performed by the character correction unit include at least one of: character decompression processing, character input color conversion processing, character ink color conversion processing, character HS processing, character TRC processing, and character quantization processing; or
(ii) the one or more processes performed by the picture correction unit include at least one of: picture decompression processing, picture input color conversion processing, picture ink color conversion processing, and picture HS processing, the one or more processes performed by the character correction unit include at least one of: character decompression processing, character input color conversion processing, character ink color conversion processing, and character HS processing, and the separated first image data and the separated second image data are synthesized with each other and the synthesized image data undergo at least one of: TRC processing, quantization processing and quantized data printing.

10. The image processing apparatus according to claim 9, wherein a threshold for a maximum number of dots in an image has to be reached before HS processing for the at least one character occurs, thereby preventing an overflow of ink.

11. The image processing apparatus according to claim 1, further comprising:
(i) a picture input color converting unit that operates to convert the first image data for the at least one picture to image data supporting a color gamut of the image processing apparatus;
(ii) a character input color converting unit that operates to convert the second image data for at least one character to image data supporting a color gamut of the image processing apparatus;
(iii) a picture ink color converting unit that operates to: (a) convert the image data related to the first image of the at least one picture processed by the picture input color converting unit to image data based on color signal data of ink used in the image processing apparatus; or (b) receive the first image data without processing in the picture input color converting unit such that the picture input color converting unit is bypassed, and convert the first image data to picture image data based on color signal data of ink used in the image processing apparatus;
(iv) a character ink color converting unit that operates to: (a) convert the image data related to the second image of the at least one character processed by the character input color converting unit to image data based on color signal data of ink used in the image processing apparatus; or (b) receive the second image data without processing in the character input color converting unit such that the character input color converting unit is bypassed, and convert the second image data to character image data based on color signal data of ink used in the image processing apparatus;
(v) a picture Head Shading ("HS") processing unit that operates to employ an HS process parameter to perform at least one HS process on the picture image data based on the color signal data of ink used in the image processing apparatus; and
(vi) a character HS processing unit that operates to employ an HS process parameter to perform at least one HS process on the character image data based on the color signal data of ink used in the image processing apparatus.

12. The image processing apparatus according to claim 1, wherein the discharge head includes a nozzle array having a plurality of nozzles for discharging ink as the liquid,
and the image processing apparatus further comprises an obtaining unit configured to obtain information, as the information on an ejection characteristic of a discharge head, on a difference of discharge amount of ink between a first nozzle group of nozzles of the nozzle array and a second nozzle group of nozzles other than the nozzles of the first nozzle group, and wherein the picture correcting unit corrects the first gray-scale value and the character correcting unit corrects the second gray-scale value based on the information obtained by the obtaining unit.

13. The image processing apparatus according to claim 1, further comprising the discharge head discharging or ejecting liquid based on the first dot data and the second dot data generated by the generating unit.

14. The image processing apparatus according to claim 1, wherein the picture correcting unit and the character correcting unit operate in parallel or at the same time.

15. The image processing apparatus according to claim 1, wherein the generating unit comprises a first generating unit and a second generating unit, wherein the first generating unit operates to generate the first dot data indicating the presence of formed dots for forming the first image on the basis of the first gray-scale value corrected by the picture correcting unit and the second generating unit operates to generate the second dot data indicating the presence of formed dots for forming the second image on the basis of the second gray-scale value corrected by the character correcting unit.

16. The image processing apparatus according to claim 1, wherein the character correcting unit and the picture correcting unit are distinct, separate or independent from each other.

17. The image processing apparatus according to claim 1, wherein the separated first image data and the separated second image data are synthesized with each other and the synthesized image data undergo at least one of: TRC processing, quantization processing and quantized data printing.

18. The image processing apparatus according to claim 1, wherein:
(i) the character correcting unit operates to correct only the first gray-scale value of the first image having the first attribute indicating that the first image is for at least one picture; and
(ii) the picture correcting unit operates to correct only the second gray-scale value of the second image having the second attribute indicating that the second image is for at least one character.

19. An image processing apparatus comprising:
an acquiring unit which acquires first image data indicating a first gray-scale value of a first image having a first attribute and a second image data indicating a second gray-scale value of a second image having a second attribute that is different from the first attribute, the first attribute indicating that the first image data is for at least one picture and the second attribute indicating that the second image data is for at least one character;
a picture correcting unit which corrects the first gray-scale value acquired by the acquiring unit on a basis of information on an ejection characteristic of a discharge head, the discharge head ejecting liquid to be used for forming the first image and the second image on a recording medium with dots;
a character correcting unit which corrects the second gray-scale value acquired by the acquiring unit by a different degree of correction from a degree of the correction for the first gray-scale value by the picture correcting unit, on a basis of the information on the ejection characteristic of the discharge head; and
a generating unit which generates first dot data indicating the presence of formed dots for forming the first image on the basis of the first gray-scale value corrected by the picture correcting unit and second dot data indicating the presence of formed dots for forming the second image on the basis of the second gray-scale value corrected by the character correcting unit, wherein a threshold for a maximum number of dots in an image has to be reached before Head Shading processing for the at least one character occurs, thereby preventing an overflow of ink.

20. An image processing apparatus comprising:
an acquiring unit which acquires first image data indicating a first gray-scale value of a first image having a first attribute and a second image data indicating a second gray-scale value of a second image having a second attribute that is different from the first attribute, the first attribute indicating that the first image data is for at least one picture and the second attribute indicating that the second image data is for at least one character;
a picture correcting unit which corrects the first gray-scale value acquired by the acquiring unit on a basis of information on an ejection characteristic of a discharge head, the discharge head ejecting liquid to be used for forming the first image and the second image on a recording medium with dots;
a character correcting unit which corrects the second gray-scale value acquired by the acquiring unit by a different degree of correction from a degree of the correction for the first gray-scale value by the picture correcting unit, on a basis of the information on the ejection characteristic of the discharge head;
a generating unit which generates first dot data indicating the presence of formed dots for forming the first image on the basis of the first gray-scale value corrected by the picture correcting unit and second dot data indicating the presence of formed dots for forming the second image on the basis of the second gray-scale value corrected by the character correcting unit;
a picture ink color converting unit that operates to: (a) convert the image data related to the first image of the at least one picture processed by the picture input color converting unit to image data based on color signal data of ink used in the image processing apparatus; or (b) receive the first image data without processing in the picture input color converting unit such that the picture input color converting unit is bypassed, and convert the first image data to picture image data based on color signal data of ink used in the image processing apparatus;
a character ink color converting unit that operates to: (a) convert the image data related to the second image of the at least one character processed by the character input color converting unit to image data based on color signal data of ink used in the image processing apparatus; or (b) receive the second image data without processing in the character input color converting unit such that the character input color converting unit is bypassed, and convert the second image data to character image data based on color signal data of ink used in the image processing apparatus;
a picture Head Shading ("HS") processing unit that operates to employ an HS process parameter to perform at least one HS process on the picture image data based on the color signal data of ink used in the image processing apparatus; and a character HS processing unit that operates to employ an HS process parameter to perform at least one HS process on the character image data based on the color signal data of ink used in the image processing apparatus.

21. The image processing apparatus according to claim 20, further comprising:
(i) a picture input color converting unit that operates to convert the first image data for the at least one picture to image data supporting a color gamut of the image processing apparatus; and
(ii) a character input color converting unit that operates to convert the second image data for at least one character to image data supporting a color gamut of the image processing apparatus.

22. An image processing method comprising:
acquiring combined image data and separating the combined image data into a first image data indicating a first gray-scale value of a first image having a first attribute and a second image data indicating a second gray-scale value of a second image having a second attribute that is different from the first attribute, the first attribute indicating that the first image data is for at least one picture and the second attribute indicating that the second image data is for at least one character;
correcting the acquired first gray-scale value on a basis of information on an ejection characteristic of a discharge head, the discharge head ejecting liquid to be used for forming the first image and the second image on a recording medium with dots;
correcting the acquired second gray-scale value by a different degree of correction from a degree of the correction for the first gray-scale value, on a basis of the information on the ejection characteristic of the discharge head; and
generating first dot data indicating the presence of formed dots for forming the first image on the basis of the corrected first gray-scale value and second dot data indicating the presence of formed dots for forming the second image on the basis of the corrected second gray-scale value.

23. The image processing method according to claim 22, wherein the generating performs a quantization process by dithering to generate the first dot data and the second dot data.

24. The image processing method according to claim 22, wherein the first image data and the second image data are image data exhibiting multi-level gray-scale values.

25. The image processing method according to claim 22, wherein the acquiring step includes decompressing the compressed first image data and second image data.

26. The image processing method according to claim 22, wherein the correcting step for the acquired first gray-scale value reduces the first gray-scale value, the correcting step for the acquired second gray-scale value reduces the second gray-scale value, and the degree of correction on the first gray-scale value is higher than the degree of correction on the second gray-scale value.

* * * * *